(12) United States Patent
Soeda et al.

(10) Patent No.: US 7,739,702 B2
(45) Date of Patent: Jun. 15, 2010

(54) OPTICAL DISK DEVICE HAVING AN OPTICAL PICK-UP MODULE AND TRAY ARRANGED TO CARRY OUT IMPROVED COOLING

(75) Inventors: Yoshinobu Soeda, Oonojyo (JP); Kaoru Sato, Kikuchi-gun (JP); Munenori Aoyagi, Kikuchi-gun (JP); Masanori Kimura, Kumamoto (JP); Takehiko Ide, Tosu (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 10/937,400

(22) Filed: Sep. 10, 2004

(65) Prior Publication Data
US 2005/0060730 A1    Mar. 17, 2005

(30) Foreign Application Priority Data

Sep. 12, 2003  (JP) ............................. 2003-321383
Sep. 26, 2003  (JP) ............................. 2003-335275
Dec. 19, 2003  (JP) ............................. 2003-422520
Dec. 19, 2003  (JP) ............................. 2003-422521
Dec. 19, 2003  (JP) ............................. 2003-422522

(51) Int. Cl.
    *G11B 33/14* (2006.01)
(52) U.S. Cl. ...................................... 720/649
(58) Field of Classification Search ................. 720/649, 720/648; 360/97.02
See application file for complete search history.

(56) References Cited

U.S. PATENT DOCUMENTS 7,086,069 B2 * 8/2006 Choi ........................... 720/603
2006/0184951 A1 * 8/2006 Shizuya et al. ............... 720/601

FOREIGN PATENT DOCUMENTS

JP    08-339678    12/1996

(Continued)

OTHER PUBLICATIONS

Machine translation of JP 8-339678 A, Tsunoda, Dec. 24, 1996.*

(Continued)

*Primary Examiner*—Julie Anne Watko
(74) *Attorney, Agent, or Firm*—Dickinson Wright PLLC

(57) ABSTRACT

An optical disk device includes an optical pick-up module including a rotating portion rotating an optical disk; a carriage mounting at least a light source and being provided movably within the optical pick-up module; and a cover having an opening formed thereon, a light being radiated from the light source through the opening toward the outside of the cover; and a tray supporting the optical pick-up module. The tray includes an optical disk attachment region portion opposed to the optical disk and an outside portion provided on an outside of the optical disk attachment region portion. The outside portion has a ledge along its portion adjacent to the circular perimeter of the optical disk. The optical disk, when mounted on the rotating portion, entirely lies between first and second planes, the first plane being defined by the surface of the cover and the second plane being defined by a first of opposing surfaces of the ledge, which first opposing surface is closer to the surface of the cover than is a second of the opposing surfaces of the ledge.

12 Claims, 28 Drawing Sheets

D-D' SECTIONAL VIEW

FOREIGN PATENT DOCUMENTS

| | | |
|---|---|---|
| JP | 11-025667 | 1/1999 |
| JP | 1125667 | 1/1999 |
| JP | 2000231782 | 8/2000 |
| JP | 2002-050103 | 2/2002 |
| JP | 2002-093138 | 3/2002 |
| JP | 2002-093138 A * | 3/2002 |
| JP | 2002-2093138 A * | 3/2002 |
| JP | 2002-230962 | 8/2002 |
| JP | 2003-085964 | 3/2003 |
| JP | 2003-296996 | 10/2003 |
| JP | 2004-234802 | 8/2004 |
| JP | 2004-310883 A * | 11/2004 |
| JP | 2004-762015 * | 11/2004 |
| JP | 2005-322277 A * | 11/2005 |
| JP | 2005-802034 * | 11/2005 |

OTHER PUBLICATIONS

Japanese Office Action dated Jan. 7, 2009 with English translation.
Japanese Office Action dated Jan. 16, 2009 with English translation thereof.

* cited by examiner

C-C' SECTION

DISK DIAMETER

D-D' SECTIONAL VIEW

RELATED ART

PLAN VIEW

SECTIONAL VIEW

PLAN VIEW

SECTIONAL VIEW

PLAN VIEW

SECTIONAL VIEW

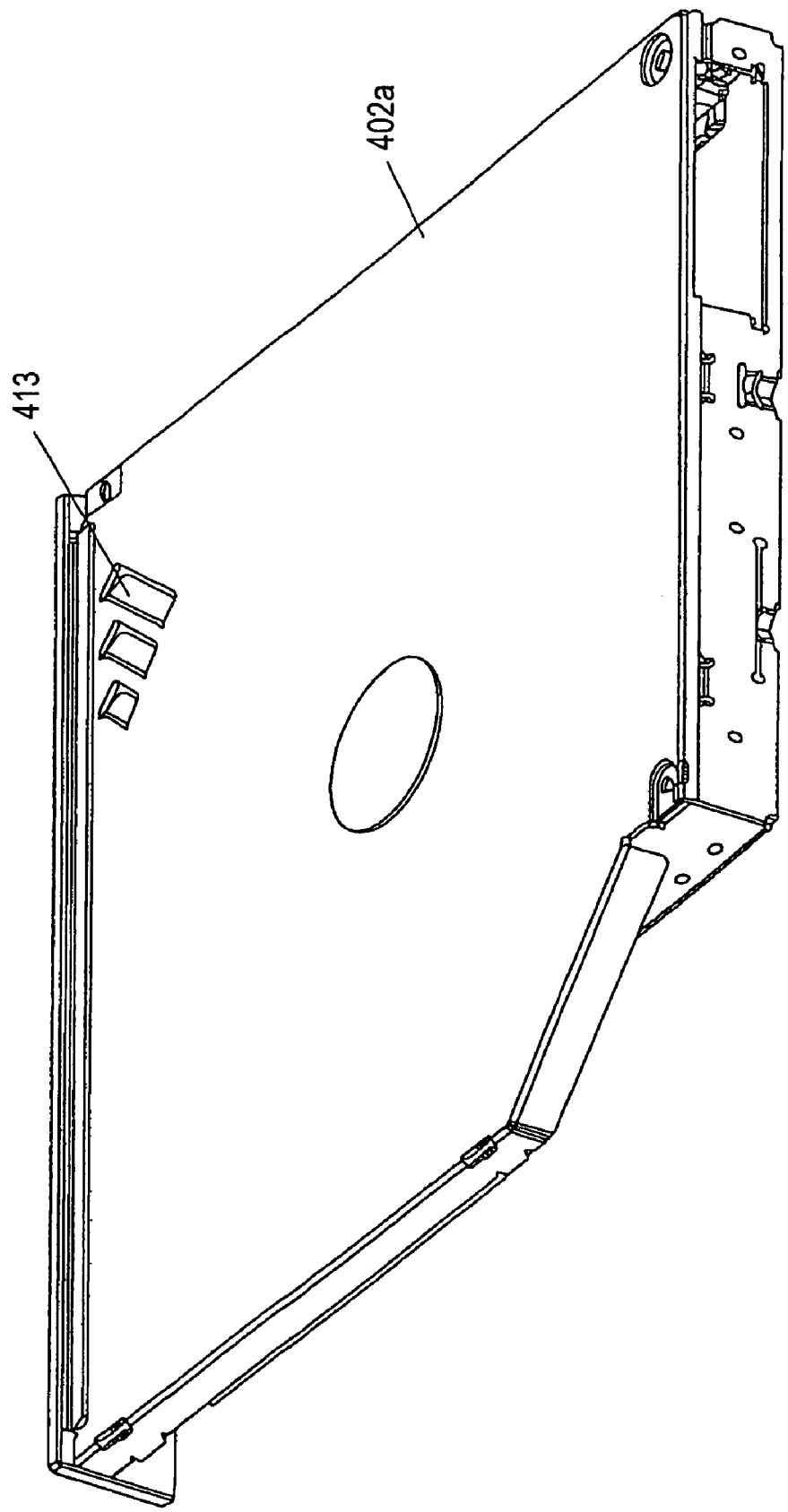

OPTICAL DISK DEVICE HAVING AN OPTICAL PICK-UP MODULE AND TRAY ARRANGED TO CARRY OUT IMPROVED COOLING

BACKGROUND OF THE INVENTION

1. Field of the Invention

The present invention relates to an optical disk device to be mounted on electronic equipment such as a personal computer or a notebook computer.

2. Description of the Related Art

For an optical disk device, a CD-ROM, a CD-R/RW and a DVD have already been used practically, and an application to each field and the development of an increase in a performance have been actively carried out. In recent years, particularly, the rate of propagation of an optical disk device built in a personal computer has also been increased with a rapid expansion of a market for the personal computer.

FIG. 9 is a perspective view showing a conventional optical disk device.

In FIG. 9, 1 denotes an optical disk device. The optical disk device 1 has a housing 2 and a tray 3 held in the housing 2 to freely appear. The housing 2 takes the shape of a bag in which metallic housing portions 2a and 2b are combined with each other and has such a structure that the tray 3 appears from the opening of the housing 2. An optical pick-up module 4 is attached to the tray 3 at a back face. A rail 3a is provided movably in both side portions of the tray 3, and is held in a rail holding portion 3b provided integrally with the tray 3. While the rail 3a is provided in only one of the side portions in FIG. 9, the same rail may be provided in the other side portion.

The housing portion 2a and the housing portion 2b are strongly fixed to each other by using engaging means and a spiral which are not shown. A conductive material such as a metal material, for example, iron, an iron alloy, aluminum, an aluminum alloy or a magnesium alloy is suitably used as the component of the housing 2. Moreover, it is also possible to use a component in which each housing portion is constituted by a resin material and a metal film having a high conductivity is formed thereon by using a method such as electrodeposition. Furthermore, the housing portions 2a and 2b may be constituted by a material of the same type respectively or materials of different types. Moreover, each of the main plane portions of the housing portions 2a and 2b has an average thickness of 0.3 mm to 1.6 mm. In the case in which the average thickness is comparatively small, the housing portion 2a and the housing portion 2b are constituted by metal materials, and a metal plate is formed by pressing, for example. In the case in which the average thickness is comparatively great, moreover, the housing portion 2a and the housing portion 2b are constituted by die casting (aluminum or a magnesium alloy).

The optical pick-up module 4 has at least a spindle motor 5 for rotating and driving an optical disk, a metallic cover 6 provided with an opening 6a from the spindle motor 5 to an outer periphery, and a carriage 7 having a part exposed from the opening 6a. The carriage 7 is held movably in a plurality of guide shafts provided on the optical pick-up module 4, and furthermore, can be moved to approach or separate from the spindle motor 5 by means of a feed motor which is not shown. 8 denotes a bezel provided on the front face of the tray 3. The bezel 8 is constituted to have such a size as to block the opening of the housing 2.

A light source such as a high power laser diode, various optical members and an objective lens for constituting an optical spot on an optical disk are mounted on the carriage 7. When recording is to be carried out over the optical disk, a high power light source and an IC for driving the light source are required. As a result, the light source or the IC generates heat very often so that a recording and reproducing characteristic is influenced. In the optical disk device 1 shown in FIG. 9, particularly, a reduction in a thickness and a size has been required. Therefore, there is a problem in that a thermal capacity is reduced. In the thin optical disk device 1 in which the central part of the housing 2 has a thickness of 14 mm or less, furthermore, 10 mm or less, particularly, this problem becomes remarkable.

A method of cooling the inside of the optical disk device has been described in (JP-A-11-25667 Publication) and (JP-A-2000-231782 Publication), for example.

These have described a method of leading an air flow generated during the rotation of an optical disk to the carriage 7 and cooling the same air flow. These methods have not supposed an optical disk device in which the central part of the housing 2 has a thickness of 14 mm or less or 10 mm or less. In such a very thin optical disk device, accordingly, a cooling effect is not always sufficient.

SUMMARY OF THE INVENTION

In order to solve the conventional problems, it is an object of the invention to provide a very thin optical disk device capable of carrying out sufficient cooling, thereby reducing a deterioration in a recording and reproducing characteristic.

In order to solve the problems, in the invention, there are provided an optical pick-up module including rotating means having a disk attachment surface and serving to rotate an optical disk, a carriage mounting at least a light source and various optical members and provided movably, and a cover having a first opening formed thereon, and a tray for supporting the optical pick-up module, and the tray includes an optical disk attachment region portion opposed to the optical disk and an optical disk attachment region outside portion provided on an outside of the optical disk attachment region portion, the optical disk attachment region portion and the optical disk attachment region outside portion have a step portion in a direction of a rotating axis of the rotating means and have a clearance on the step portion, and an outer edge portion of an opposite surface to a surface of the optical disk attached to the disk attachment surface which is opposed to the optical disk attachment region portion is present within the clearance in the direction of the rotating axis and an air flow generated by a rotation of the optical disk flows into the clearance.

According to the invention, an air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

In order to solve the problems, the invention provides an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, a void is provided in a part of the optical disk attachment region outside portion of the tray which is opposed to the first opening, a gas introducing member is fixed above the first opening in a position corresponding to a part disposed above the void when the optical pick-up module is to be attached to the tray, the gas introducing member is formed as a separate and independent member from the tray and the optical pick-up module, and a third opening is provided on an opposed side to the first opening.

By this structure, air in a portion having a comparatively low temperature between the housing and the optical disk is effectively led to a portion between the housing and the tray by the rotation of the optical disk so that an air flow can be circulated efficiently and a cooling effect can be thus enhanced. Consequently, it is possible to particularly take a countermeasure against heat in a thin and small disk device effectively. Thus, it is possible to eliminate a drawback such as a deterioration in a recording and reproducing characteristic which is caused by the generation of the heat.

According to the invention, an air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

In order to solve the problems, the invention provides an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, a void is provided in a part of the optical disk attachment region outside portion of the tray which is opposed to the first opening, a protruded portion obtained by erecting a part of the cover of the optical pick-up module is provided in a position corresponding to a part disposed above the void, and a third opening is provided on an opposed side to the first opening.

By this structure, air in a portion having a comparatively low temperature between the housing and the optical disk is effectively led to a portion between the housing and the tray by the rotation of the optical disk so that an air flow can be circulated efficiently and a cooling effect can be thus enhanced. Consequently, it is possible to particularly take a countermeasure against heat in a thin and small disk device effectively. Thus, it is possible to eliminate a drawback such as a deterioration in a recording and reproducing characteristic which is caused by the generation of the heat.

According to the invention, an air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

In the invention, there are provided an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, and a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, and a third opening is provided in a part of the optical disk attachment region outside portion of the tray which is opposed to the first opening.

According to the invention, an air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

BRIEF DESCRIPTION OF THE DRAWINGS

FIG. 31 is a view showing the housing of an optical disk device according to another embodiment of the invention.

DESCRIPTION OF THE PREFERRED EMBODIMENTS

Figure 1:
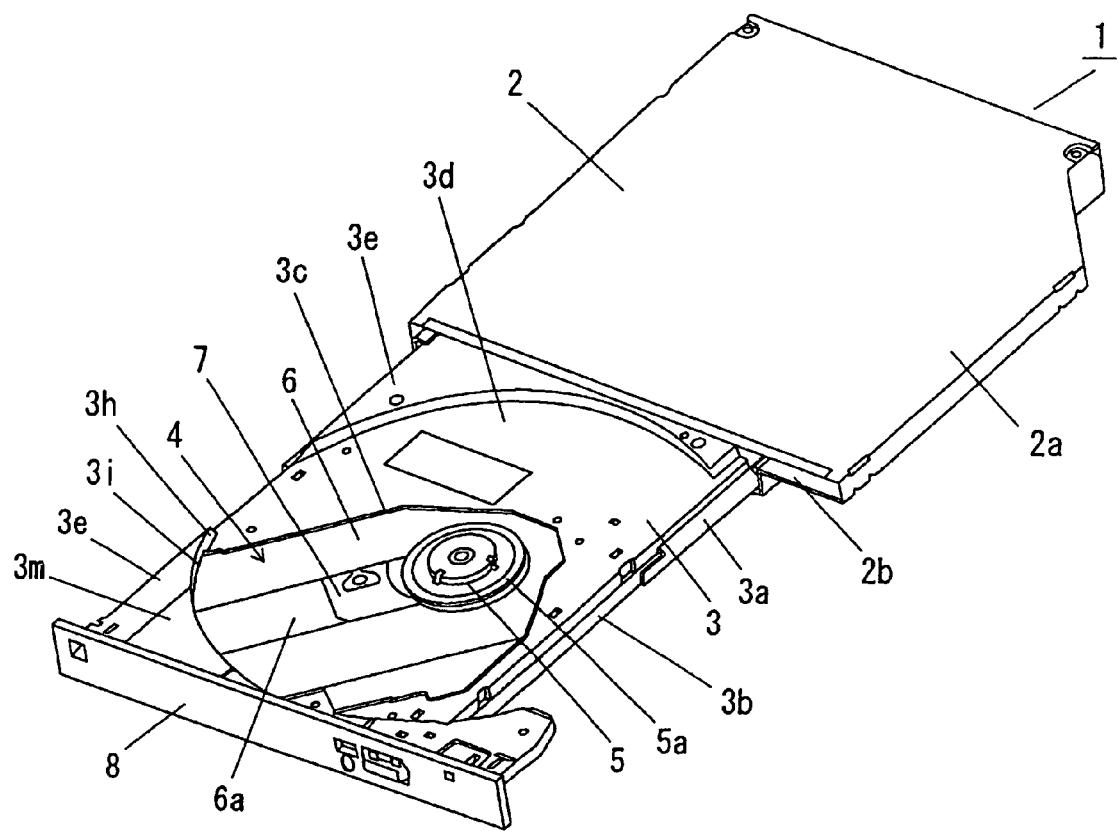
FIG. 1 is a perspective view showing an optical disk device according to an embodiment of the invention.

A first aspect of the invention is directed to an optical disk device comprising an optical pick-up module including rotating means having a disk attachment surface and serving to rotate an optical disk, a carriage mounting at least a light source and various optical members and provided movably, and a cover having a first opening formed thereon, and a tray for supporting the optical pick-up module, wherein the tray includes an optical disk attachment region portion opposed to the optical disk and an optical disk attachment region outside portion provided on an outside of the optical disk attachment region portion, the optical disk attachment region portion and the optical disk attachment region outside portion have a step portion in a direction of a rotating axis of the rotating means and have a third opening on the step portion, and an outer edge portion of an opposite surface to a surface of the optical disk attached to the disk attachment surface which is opposed to the optical disk attachment region portion is present within the third opening in the direction of the rotating axis and an air flow generated by a rotation of the optical disk flows into the third opening. The air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

A second aspect of the invention is directed to the optical disk device according to the first aspect of the invention, wherein the optical pick-up module has a part exposed from a second opening provided in the optical disk attachment region portion and a part provided on a back face side of the optical disk attachment region outside portion, and the third opening is formed between the back face of the optical disk attachment region outside portion and the optical pick-up module. An air flow can be circulated efficiently through the third opening. Therefore, it is possible to particularly take a countermeasure against heat in a thin and small optical disk device.

A third aspect of the invention is directed to the optical disk device according to the first aspect of the invention, wherein a concave portion is provided on a back face side of the optical disk attachment region outside portion and has an opening portion on the step portion, and the third opening is formed between the concave portion and at least one of the optical pick-up module and the optical disk attachment region portion. An air flow taken from the opening portion is circulated efficiently through the concave portion. Therefore, it is possible to particularly take a countermeasure against heat in a thin and small optical disk device effectively.

A fourth aspect of the invention is directed to the optical disk device according to the third aspect of the invention, wherein the opening portion is opposed to the first opening, and furthermore, is extended in an opposite direction to a direction of a rotation of the disk with respect to the first opening. It is possible to effectively take in an air flow generated in the outer edge portion of the disk by the rotation of the disk.

A fifth aspect of the invention is directed to the optical disk device according to the third aspect of the invention, wherein the concave portion is constituted to include a first side wall formed on the tray almost orthogonally to a tray pull-out direction, a second side wall formed on the tray opposite to the first opening in non-parallel with the first side wall, and a bottom wall formed on the tray. It is possible to effectively take in an air flow generated in the outer edge portion of the disk by the rotation of the disk and to efficiently lead the same air flow from the first opening to a region on the opposite side of the optical disk attachment side of the tray (a space interposed between the tray 3 and the housing portion 2b), thereby effectively cooling a high power light source and a driving IC for the light source which are mounted on the carriage.

A sixth aspect of the invention is directed to the optical disk device according to the fifth aspect of the invention, wherein a second side portion is provided with an inclined surface which is inclined with respect to the bottom wall. It is possible to effectively lead an air flow from the first opening to the region of the tray on the opposite side to the optical disk attachment side (the space interposed between the tray 3 and the housing portion 2b) through the inclined surface.

A seventh aspect of the invention is directed to the optical disk device according to the third aspect of the invention, wherein a protruded portion is provided in the optical disk attachment region outside portion opposed to the concave portion as seen in the direction of the rotating axis of the disk. It is possible to form the concave portion for effectively taking in an air flow generated by the rotation of the optical disk without thickening the whole tray.

An eighth aspect of the invention is directed to the optical disk device according to the seventh aspect of the invention, wherein the protruded portion is constituted by a separate member from the tray and the separate member is attached to the tray to form the protruded portion. The thickness of the concave portion can be set more flexibly so that the degree of freedom of design can be increased.

A ninth aspect of the invention is directed to the optical disk device according to the first aspect of the invention, wherein a part of the first opening is provided opposite to a back face side of the optical disk attachment region outside portion. It is possible to effectively lead an air flow from the first opening to the region of the tray on the opposite side to the optical disk attachment side.

A tenth aspect of the invention is directed to the optical disk device according to the first aspect of the invention, wherein a part of the first opening is provided opposite to a back face side of the optical disk attachment region outside portion, and an opposed portion to the first opening is formed to be larger than the other portions. It is possible to take in an air flow from the first opening more efficiently.

An eleventh aspect of the invention is directed to the optical disk device according to the first aspect of the invention, wherein a central part of a housing has a thickness of 14 mm or less (or 10 mm or less). In such a thin optical disk device, the invention is particularly effective.

A twelfth aspect of the invention is directed to an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, a void is provided in a part of the optical disk attachment region outside portion of the tray which is opposed to the first opening, a gas introducing member is fixed above the first opening in a position corresponding to a part disposed above the void, the gas introducing member is formed as a separate and independent member from the tray and the optical pick-up module, and a third opening is provided on an opposed side to the first opening.

By this structure, air in a portion having a comparatively low temperature between the housing and the optical disk is effectively led to a portion between the housing and the tray by the rotation of the optical disk so that an air flow can be circulated efficiently and a cooling effect can be thus enhanced. Consequently, it is possible to particularly take a countermeasure against heat in a thin and small disk device effectively. Thus, it is possible to eliminate a drawback such as a deterioration in a recording and reproducing characteristic which is caused by the generation of the heat.

A thirteenth aspect of the invention is directed to the optical disk device according to the twelfth aspect of the invention, further comprising means for attaching the optical disk to the first main surface side and rotating the optical disk by the rotating means, thereby leading a gas flow generated in an outer peripheral portion of the optical disk to a portion between a second main surface on an opposite side of the first main surface in the tray and the housing through the third opening.

By this structure, it is possible to lead the air flow to a region in which a temperature can easily be raised by the generation of heat in the optical disk device. Thus, a cooling effect can be enhanced.

A fourteenth aspect of the invention is directed to the optical disk device according to the twelfth aspect of the invention, wherein the third opening is provided opposite to both the first opening and the cover disposed in the optical pick-up module.

By this structure, it is possible to adjust the degree of cooling by regulating the amount of the opening of the third opening.

A fifteenth aspect of the invention is directed to the optical disk device according to the twelfth aspect of the invention, wherein the third opening is provided in communication with the optical disk attachment region portion.

By this structure, the air in a portion having a comparatively low temperature between the housing and the optical disk can be directly led to the portion between the housing and the tray with the rotation of the optical disk without scattering. Thus, an efficiency of introducing the air flow can be increased.

A sixteenth aspect of the invention is directed to the optical disk device according to the twelfth aspect of the invention, wherein the first opening is provided between the rotating means and an outer end of the optical pick-up module, and an end of the first opening which is provided on an opposite side of the rotating means is provided on a front end face side of the tray.

By this structure, the third opening can be provided on a closer side to outside air when the optical disk device is attached to electronic equipment. Consequently, a cooling effect can be enhanced.

A seventeenth aspect of the invention is directed to the optical disk device according to the twelfth aspect of the invention, wherein the third opening is provided in a front end face portion of the tray with respect to the rotating means.

By this structure, the third opening can be provided on a closer side to outside air when the optical disk device is attached to electronic equipment. Consequently, a cooling effect can be enhanced.

A eighteenth aspect of the invention is directed to the optical disk device according to the twelfth aspect of the invention, wherein the third opening is provided between a front end face of the tray and the optical disk attachment region portion.

By this structure, the third opening can be provided on a closer side to outside air when the optical disk device is attached to electronic equipment. Consequently, a cooling effect can be enhanced.

An nineteenth aspect of the invention is directed to the optical disk device according to the twelfth aspect of the invention, wherein the third opening is formed by an external wall provided in the gas introducing member and the external wall is provided to block a gas flow generated on the optical disk.

By this structure, it is possible to effectively lead the air flow to the third opening by utilizing the thickness of the tray. Thus, it is possible to efficiently carry out cooling with the air flow.

A twentieth aspect of the invention is directed to the optical disk device according to the nineteenth aspect of the invention, wherein the external wall is provided in almost parallel with a straight line passing through a center of the rotating means. It is possible to effectively lead the air flow to the third opening by utilizing the thickness of the tray. Thus, it is possible to efficiently carry out cooling with the air flow.

A twenty-first aspect of the invention is directed to the optical disk device according to the nineteenth aspect of the invention, wherein the external wall is provided in almost parallel with a direction of pull-out of the tray. It is possible to effectively lead the air flow to the third opening by utilizing the thickness of the tray. Thus, it is possible to efficiently carry out cooling with the air flow.

An twenty-second aspect of the invention is directed to the optical disk device according to the nineteenth aspect of the invention, wherein the external wall takes a concave shape. It is possible to effectively lead the air flow to the third opening by utilizing the thickness of the tray. Thus, it is possible to efficiently carry out cooling with the air flow.

A twenty-third aspect of the invention is directed to the optical disk device according to the nineteenth aspect of the invention, wherein a central part of the housing has a thickness of 14 mm or less. In such a thin optical disk device, a cooling effect is particularly remarkable.

A twenty-fourth aspect of the invention is directed to an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, a void is provided in a part of the optical disk attachment region outside portion of the tray which is opposed to the first opening, a protruded portion obtained by erecting a part of the cover of the optical pick-up module is provided in a position corresponding to a part disposed above the void, and a third opening is provided on an opposed side to the first opening.

By this structure, air in a portion having a comparatively low temperature between the housing and the optical disk is effectively led to a portion between the housing and the tray by the rotation of the optical disk so that an air flow can be circulated efficiently and a cooling effect can be thus enhanced. Consequently, it is possible to particularly take a countermeasure against heat in a thin and small disk device effectively. Thus, it is possible to eliminate a drawback such as a deterioration in a recording and reproducing characteristic which is caused by the generation of the heat.

A twenty-fifth aspect of the invention is directed to an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, a void is provided in a part of the optical disk attachment region outside portion of the tray which is opposed to the first opening, a protruded portion taking an erected shape is formed by welding or adhesion in a region of the cover of the optical pick-up module which is linked to the first opening, and a third opening is provided on an opposed side to the first opening.

By this structure, air in a portion having a comparatively low temperature between the housing and the optical disk is effectively led to a portion between the housing and the tray by the rotation of the optical disk so that an air flow can be circulated efficiently and a cooling effect can be thus enhanced. Consequently, it is possible to particularly take a countermeasure against heat in a thin and small disk device effectively. Thus, it is possible to eliminate a drawback such as a deterioration in a recording and reproducing characteristic which is caused by the generation of the heat.

A twenty-sixth aspect of the invention is directed to the optical disk device according to the twenty-fourth, further comprising means for attaching the optical disk to the first main surface side and rotating the optical disk by the rotating means, thereby leading a gas flow generated in an outer peripheral portion of the optical disk to a portion between a second main surface on an opposite side of the first main surface in the tray and the housing through the third opening.

By this structure, it is possible to lead the air flow to a region in which a temperature can easily be raised by the generation of heat in the optical disk device. Thus, a cooling effect can be enhanced.

A twenty-seventgh aspect of the invention is directed to the optical disk device according to the twenty-fifth, further comprising means for attaching the optical disk to the first main surface side and rotating the optical disk by the rotating means, thereby leading a gas flow generated in an outer peripheral portion of the optical disk to a portion between a second main surface on an opposite side of the first main surface in the tray and the housing through the third opening.

By this structure, it is possible to lead the air flow to a region in which a temperature can easily be raised by the generation of heat in the optical disk device. Thus, a cooling effect can be enhanced.

A twenty-eighth aspect of the invention is directed to the optical disk device according to the twenty-fourth aspect of the invention, wherein the third opening is provided opposite to both the first opening and the cover disposed in the optical pick-up module.

By this structure, it is possible to adjust the degree of cooling by regulating the amount of the opening of the third opening.

A twenty-ninth aspect of the invention is directed to the optical disk device according to the twenty-fifth aspect of the invention, wherein the third opening is provided opposite to both the first opening and the cover disposed in the optical pick-up module.

By this structure, it is possible to adjust the degree of cooling by regulating the amount of the opening of the third opening.

A thirtieth aspect of the invention is directed to the optical disk device according to the twenty-fourth of the invention, wherein the third opening is provided in communication with the optical disk attachment region portion.

By this structure, the air in a portion having a comparatively low temperature between the housing and the optical disk can be directly led to the portion between the housing and the tray with the rotation of the optical disk without scattering. Thus, an efficiency of introducing the air flow can be increased.

A thirty-first aspect of the invention is directed to the optical disk device according to the twenty-fifth of the invention, wherein the third opening is provided in communication with the optical disk attachment region portion.

By this structure, the air in a portion having a comparatively low temperature between the housing and the optical disk can be directly led to the portion between the housing and the tray with the rotation of the optical disk without scattering. Thus, an efficiency of introducing the air flow can be increased.

A thirty-second aspect of the invention is directed to the optical disk device according to twenty-fourth aspect of the invention, wherein the first opening is provided between the rotating means and an outer end of the optical pick-up module, and an end of the first opening which is provided on an opposite side of the rotating means is provided on a front end face side of the tray.

By this structure, the third opening can be provided on a closer side to outside air when the optical disk device is attached to electronic equipment. Consequently, a cooling effect can be enhanced.

A thirty-third aspect of the invention is directed to the optical disk device according to twenty-fifth aspect of the invention, wherein the first opening is provided between the rotating means and an outer end of the optical pick-up module, and an end of the first opening which is provided on an opposite side of the rotating means is provided on a front end face side of the tray.

By this structure, the third opening can be provided on a closer side to outside air when the optical disk device is attached to electronic equipment. Consequently, a cooling effect can be enhanced.

A thirty-fourth aspect of the invention is directed to the optical disk device according to the twenty-fourth aspect of the invention, wherein the third opening is provided in a front end face portion of the tray with respect to the rotating means.

By this structure, the third opening can be provided on a closer side to outside air when the optical disk device is attached to electronic equipment. Consequently, a cooling effect can be enhanced.

A thirty-fifth aspect of the invention is directed to the optical disk device according to the twenty-fifth aspect of the invention, wherein the third opening is provided in a front end face portion of the tray with respect to the rotating means.

By this structure, the third opening can be provided on a closer side to outside air when the optical disk device is attached to electronic equipment. Consequently, a cooling effect can be enhanced.

An thirty-sixth aspect of the invention is directed to the optical disk device according to twenty-fourth aspect of the invention, wherein the third opening is provided between a front end face of the tray and the optical disk attachment region portion.

By this structure, the third opening can be provided on a closer side to outside air when the optical disk device is attached to electronic equipment. Consequently, a cooling effect can be enhanced.

An thirty-seventh aspect of the invention is directed to the optical disk device according to twenty-fifth aspect of the invention, wherein the third opening is provided between a front end face of the tray and the optical disk attachment region portion.

By this structure, the third opening can be provided on a closer side to outside air when the optical disk device is attached to electronic equipment. Consequently, a cooling effect can be enhanced.

A thirty-eighth aspect of the invention is directed to the optical disk device according to the twenty-sixth of the invention, wherein a central part of the housing has a thickness of 14 mm or less. In such a thin optical disk device, a cooling effect is particularly remarkable.

A thirty-ninth aspect of the invention is directed to the optical disk device according to the twenty-sixth of the invention, wherein a central part of the housing has a thickness of 14 mm or less. In such a thin optical disk device, a cooling effect is particularly remarkable.

A fortieth aspect of the invention is directed to an optical disk device comprising an optical pick-up module including rotating means for rotating an optical disk, a carriage mounting at least a light source and various optical members and provided movably, and a cover having a first opening formed thereon, a tray having a second opening and having the optical pick-up module attached thereto in order to expose a part of the optical pick-up module from the second opening, and a housing for holding the tray to freely appear, wherein a first main surface of the tray includes an optical disk attachment region portion and an optical disk attachment region outside portion provided on an outside of the optical disk attachment region portion, the tray and the optical pick-up module are coupled to each other in such a manner that the optical disk attachment region outside portion and the optical pick-up module are opposed to each other, and a third opening is provided in a part of the optical disk attachment region outside portion of the tray which is opposed to the first opening. An air flow can be circulated efficiently. Therefore, it is possible to particularly take a countermeasure against heat in a thin and small optical disk device. Thus, it is possible to eliminate a drawback such as a deterioration in a recording and reproducing characteristic which is caused by the heat.

A forty-first aspect of the invention is directed to the optical disk device according to the fortieth of the invention, wherein the optical disk attachment region portion of the tray includes a surface of a part of the tray and a surface of the cover of the optical pick-up module, and the optical disk attachment region outside portion of the tray is provided to be higher by one step than the optical disk attachment region portion and the third opening is provided in the opposed part to the first opening in the portion which is provided to be higher by one step. It is possible to prevent an air flow generated during the rotation of the optical disk in the optical disk attachment region from being scattered toward an outside. Thus, it is possible to efficiently supply the air flow into the third opening.

A forty-second aspect of the invention is directed to the optical disk device according to the fortieth aspect of the invention, wherein the optical disk is attached to the first main surface side and is rotated by the rotating means, thereby leading a gas flow generated in an outer peripheral portion of the optical disk to a portion between a second main surface on an opposite side of the first main surface in the tray and the housing through the third opening. The air flow can be led to a region of a member having a comparatively high temperature. Thus, a cooling efficiency can be increased.

A forty-third aspect of the invention is directed to the optical disk device according to the fortieth aspect of the invention, wherein the third opening is provided opposite to both the first opening and the cover provided in the optical pick-up module. The opening amount of the third opening can be regulated and the degree of cooling can be thus adjusted.

A forty-fourth aspect of the invention is directed to the optical disk device according to the fortieth aspect of the invention, wherein the third opening is provided in communication with the optical disk attachment region portion. An air flow generated in the optical disk attachment region can be efficiently led to the third opening.

A forty-fifth aspect of the invention is directed to the optical disk device according to the fortieth aspect of the invention, wherein the first opening is provided between the rotating means and an outer end of the optical pick-up module, and an end of the first opening which is provided on an opposite side of the rotating means is provided on a front end face side of the tray. The third opening can be provided in a portion which is as close to outside air as possible when the optical disk device is to be attached to electronic equipment.

A forty-sixth aspect of the invention is directed to the optical disk device according to the fortieth aspect of the invention, wherein the third opening is provided in a front end face portion of the tray with respect to the rotating means. The third opening can be provided in a portion which is as close to outside air as possible when the optical disk device is to be attached to electronic equipment.

An forty-seventh aspect of the invention is directed to the optical disk device according to the fortieth aspect of the invention, wherein the third opening is provided between a front end face of the tray and the optical disk attachment region portion. The third opening can be provided in a portion which is as close to outside air as possible when the optical disk device is to be attached to electronic equipment.

A forty-eighth aspect of the invention is directed to the optical disk device according to the fortieth aspect of the invention, wherein an external wall constituting the third opening is provided to block a gas flow generated on the optical disk. By utilizing the thickness of the tray, it is possible to effectively lead the air flow to the third opening.

A forty-ninth aspect of the invention is directed to the optical disk device according to the forty-eighth aspect of the invention, wherein the external wall is provided in almost parallel with a straight line passing through a center of the rotating means. By utilizing the thickness of the tray, it is possible to effectively lead the air flow to the third opening.

An fiftieth aspect of the invention is directed to the optical disk device according to the forty-eighth aspect of the invention, wherein the external wall is provided in almost parallel with a direction of pull-out of the tray. By utilizing the thickness of the tray, it is possible to effectively lead the air flow to the third opening.

A fifty-first aspect of the invention is directed to the optical disk device according to the fifty-eighth aspect of the invention, wherein the external wall takes a concave shape. By utilizing the thickness of the tray, it is possible to effectively lead the air flow to the third opening.

A fifty-second aspect of the invention is directed to the optical disk device according to the fortieth aspect of the invention, wherein a central part of the housing has a thickness of 14 mm or less (or 10 mm or less). In such a thin optical disk device, the invention is particularly effective.

First Embodiment

An embodiment of an optical disk device according to the first embodiment of the invention will be described below.

Figure 2:
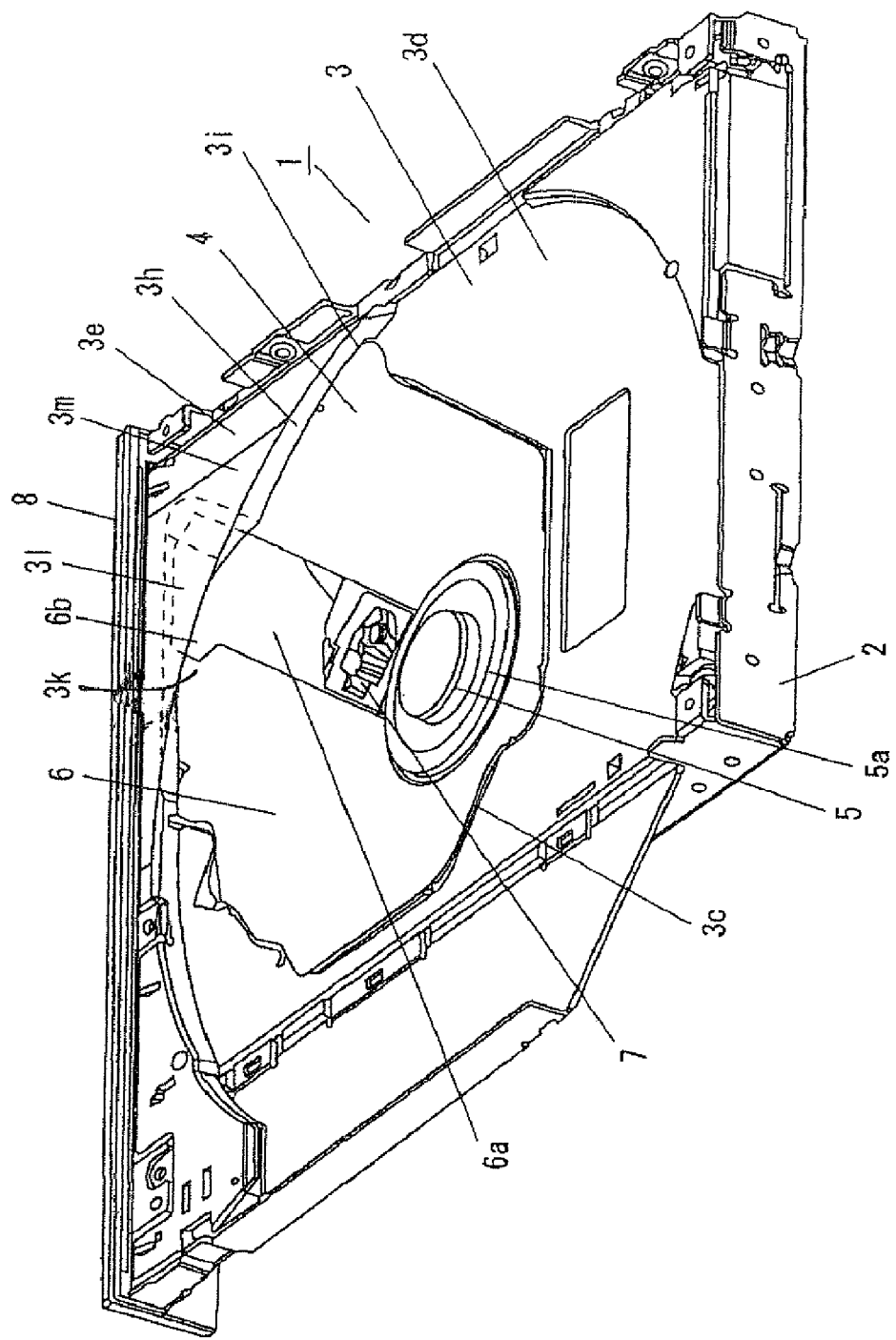
FIG. 2 is a perspective view showing the optical disk device according to the embodiment of the invention.
Figure 3:
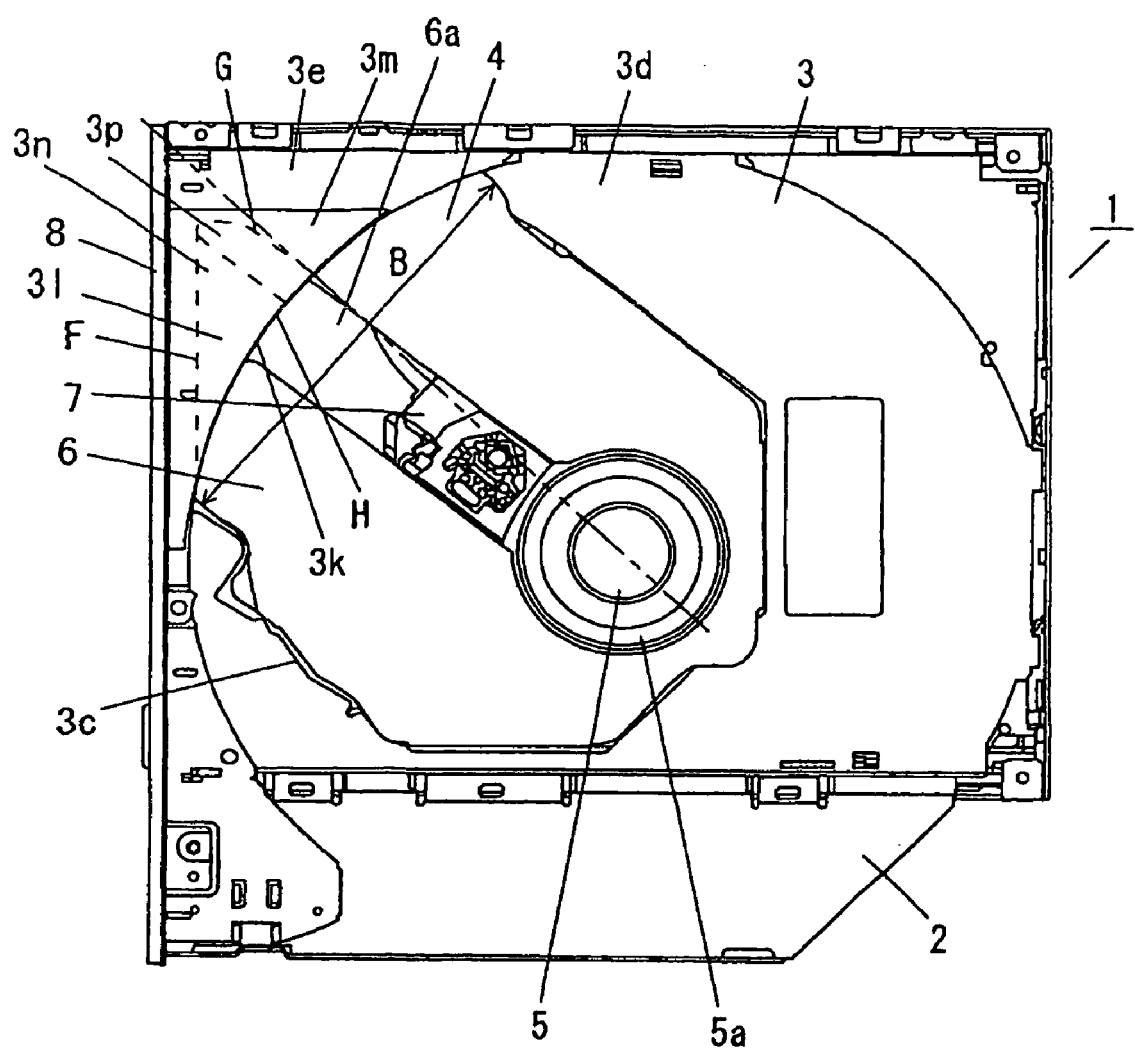
FIG. 3 is a view showing the optical disk device according to the embodiment of the invention as seen from a surface.
Figure 4:
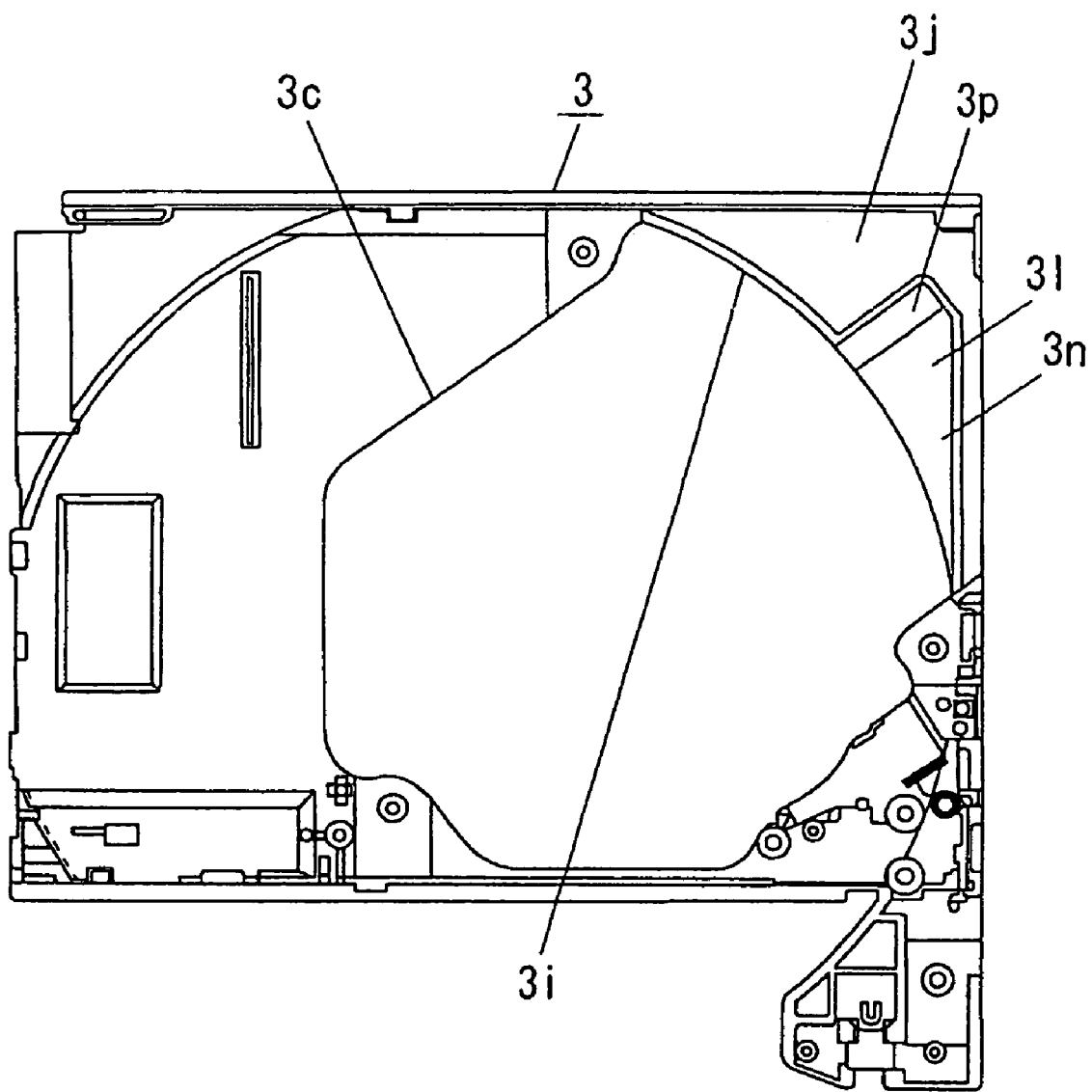
FIG. 4 is a view showing the tray of the optical disk device according to the embodiment of the invention as seen from a back face.
Figure 5:
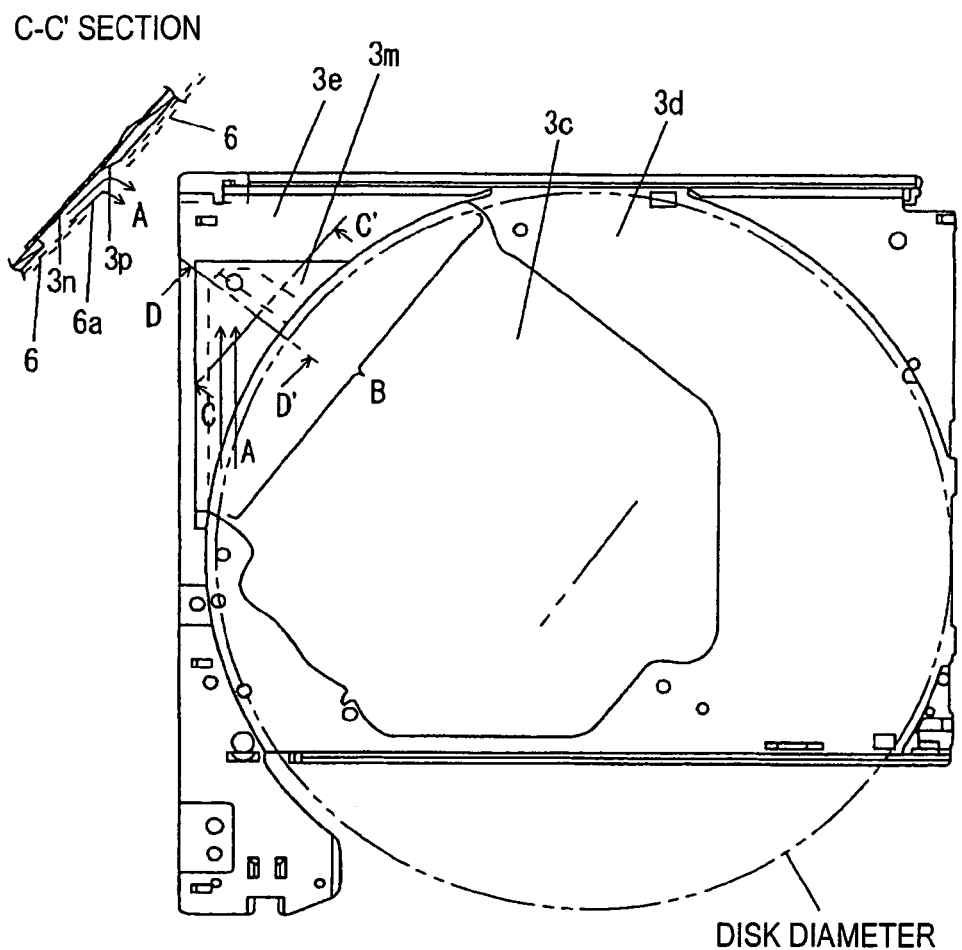
FIG. 5 is a view showing the tray of the optical disk device according to the embodiment of the invention as seen from a surface.
Figure 6:
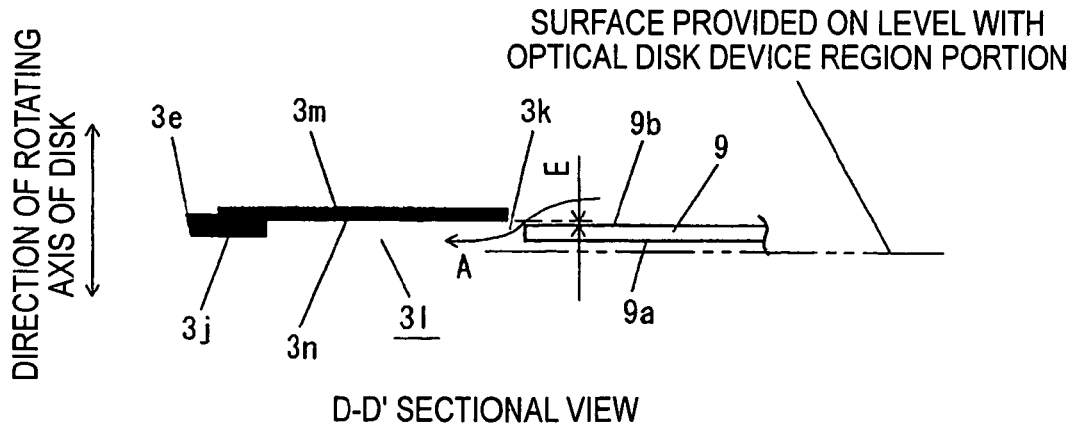
FIG. 6 is a partial sectional view showing the optical disk device according to the embodiment of the invention.
Figure 7:
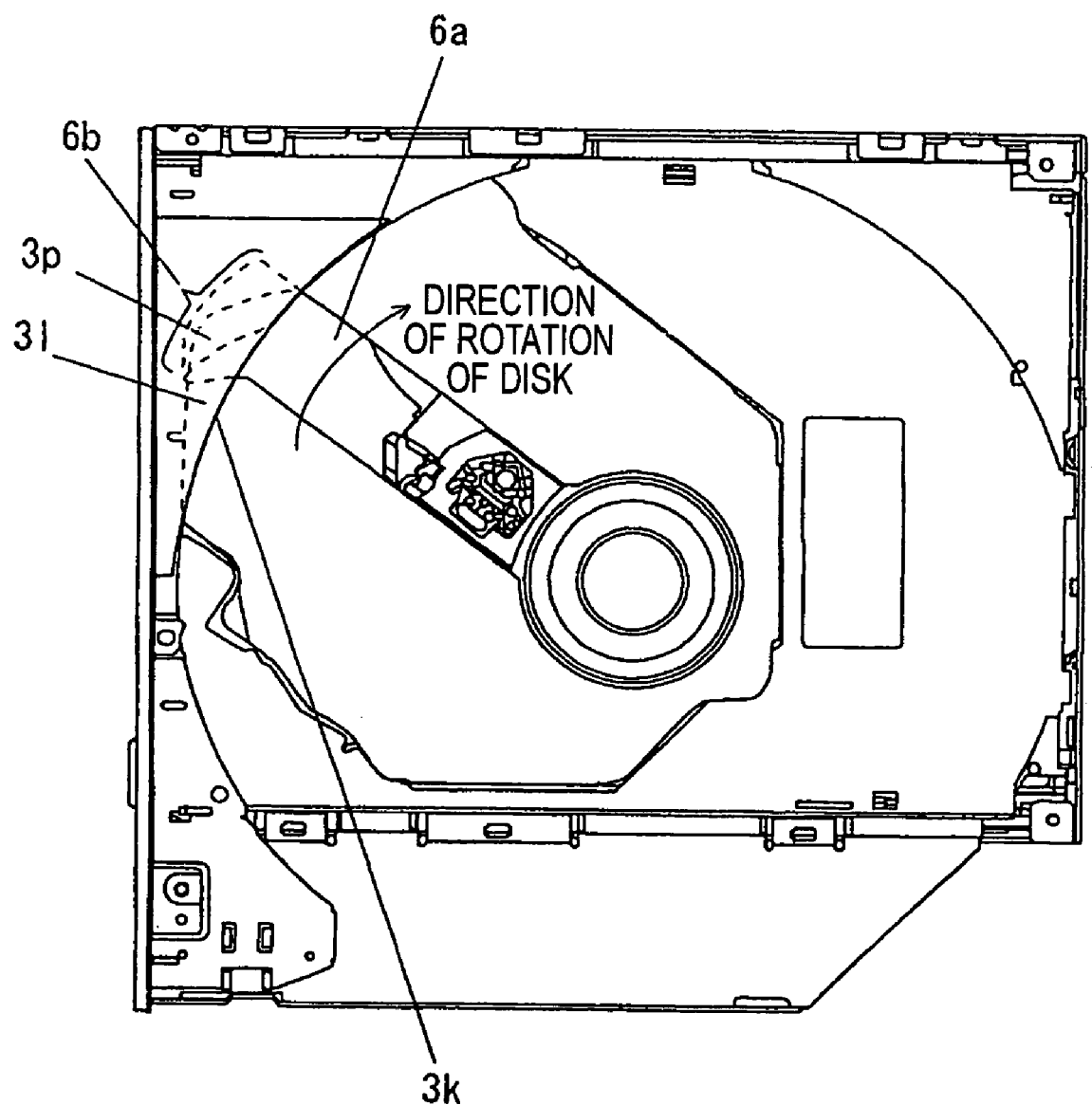
FIG. 7 is a view showing the optical disk device according to another embodiment of the invention as seen from a surface.
Figure 8:
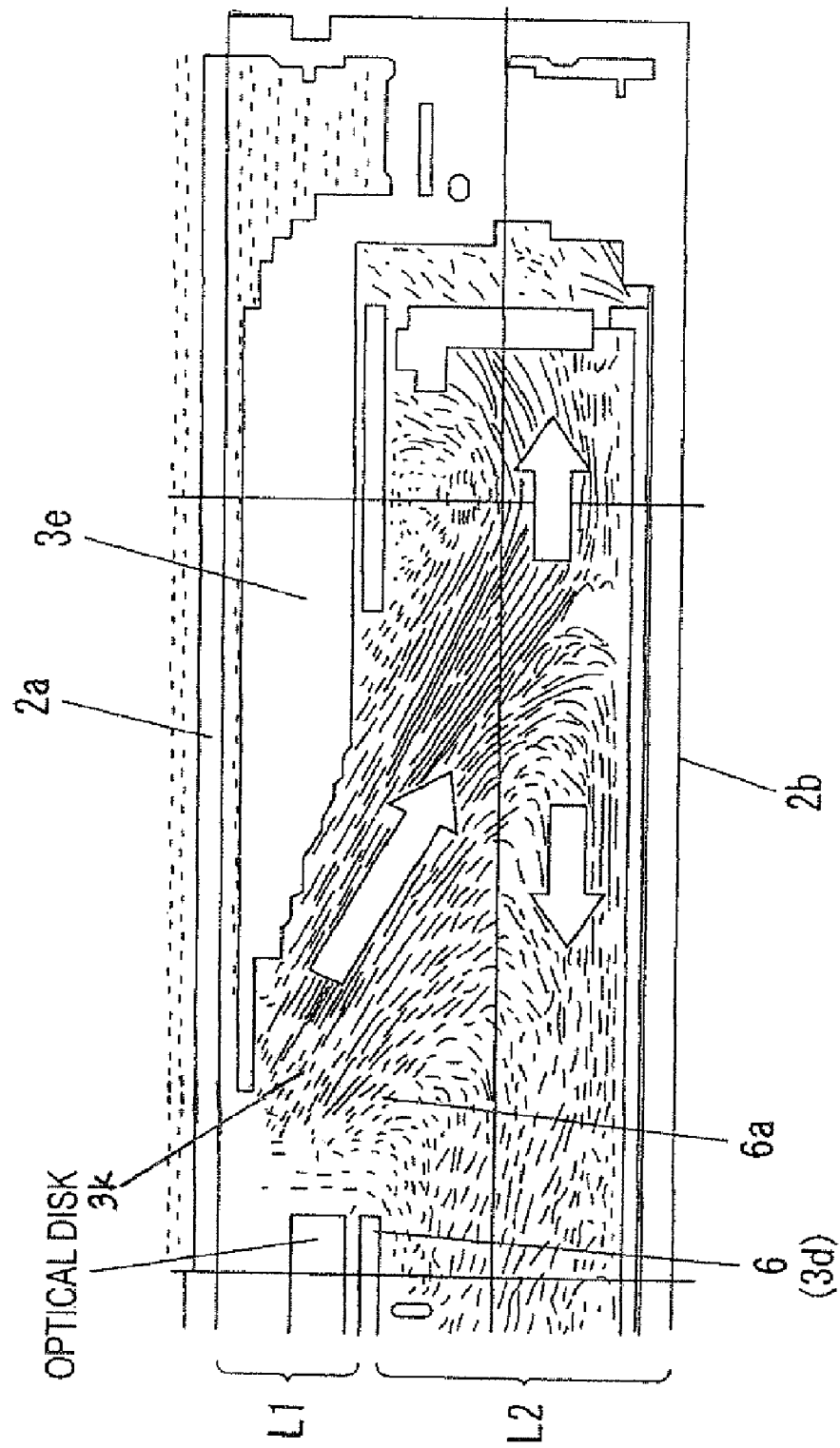
FIG. 8 is a view showing an air flow.

FIGS. 1 and 2 are perspective views showing an optical disk device according to an embodiment of the invention, FIG. 3 is a view showing the optical disk device according to the embodiment of the invention as seen from a surface (a disk attachment side), FIG. 4 is a view showing the tray of the optical disk device according to the embodiment of the invention as seen from a back face (an opposite side to the disk attachment side), FIG. 5 is a view showing the tray of the optical disk device according to the embodiment of the invention as seen from the surface (the disk attachment side), FIG. 6 is a partial sectional view showing the optical disk device according to the embodiment of the invention, FIG. 7 is a view showing the optical disk device according to another embodiment of the invention as seen from the surface (the disk attachment side), and FIG. 8 is a view showing an air flow.

In FIG. 1, 1 denotes an optical disk device. The optical disk device 1 has a housing 2 and a tray 3 held in the housing 2 to freely appear. FIG. 1 shows a state in which the tray 3 is pulled out of the housing 2. The housing 2 has a bag-shaped structure in which a hosing portion 2a and a housing portion 2b are combined with each other in the same manner as in the conventional art, and the tray 3 appears from the opening of the housing 2. FIGS. 2 and 3 are views showing a state in which the tray 3 is accommodated in the housing 2. For explanation, the housing portion 2a is removed.

It is preferable that the housing portion 2a and the housing portion 2b should be strongly fixed to each other by using engaging means and a spiral which are not shown. A conductive material such as a metal material, for example, iron, an iron alloy, aluminum, an aluminum alloy or a magnesium alloy is suitably used as the component of the housing 2. Moreover, it is also possible to use a component in which each housing portion is constituted by a resin material and a metal film having a high conductivity is formed thereon by using a method such as electrodeposition. Furthermore, the housing portions 2a and 2b may be constituted by a material of the same type respectively or materials of different types. Moreover, each of the main plane portions of the housing portions 2a and 2b has an average thickness of 0.3 mm to 1.6 mm. In the case in which the average thickness is comparatively small, the housing portion 2a and the housing portion 2b are constituted by metal materials, and a metal plate is formed by pressing, for example. In the case in which the average thickness is comparatively great, moreover, the housing portion 2a and the housing portion 2b are constituted by die casting (aluminum or a magnesium alloy).

The tray 3 is constituted by a frame formed of a resin. An optical disk attachment region portion 3d is provided in the part of the tray 3 which is opposed to the disk in the attachment of the disk, and an outer periphery takes a circular shape corresponding to the shape of the optical disk. An optical disk attachment region outside portion 3e is provided on the outside of the optical disk attachment region portion 3d, and the optical disk attachment region portion 3d is provided with a concave portion which is concaved from the optical disk attachment region outside portion 3e by approximately 1.5 mm to 4 mm (which is equal to or slightly greater than the thickness of the optical disk to be attached). In the embodiment, it is assumed that the tray 3 takes an almost square shape and an optical disk having a maximum diameter to be attached is disk-shaped. Therefore, the optical disk attachment region portion 3d takes an almost circular shape as described above, and furthermore, the diameter of the optical disk attachment region portion 3d is equal to the diameter of the optical disk having the maximum diameter which might be attached or is greater than the same diameter by 1 mm to 7 mm. The optical disk attachment region outside portion 3e takes an almost triangular shape. Moreover, the optical disk attachment region portion 3d indicates a region including an opposed portion to the optical disk and having a slight clearance in an outer peripheral portion in the attachment of the optical disk, and the optical disk attachment region outside portion 3d indicates a region which is not opposed to the main surface of the optical disk at all.

An opening 3c is provided on the optical disk attachment region portion 3d, and an optical pick-up module 4 is inserted from a back face and is thus attached to the opening 3c. The optical pick-up module 4 has a most part exposed to the optical disk attachment surface side and a part provided on the back side of the optical disk attachment region outside portion 3e. For this reason, an adjacent step portion 3h is provided with an avoiding portion 3i in order to avoid a collision with the optical pick-up module 4.

A spindle motor 5 is provided on almost the center of the optical disk attachment region portion 3d. At least a part of the spindle motor 5 is protruded from the opening 3c, and furthermore, a carriage 7 and a cover 6 are also exposed.

8 denotes a bezel provided on the front end face of the tray 3. The bezel 8 is constituted to have such a size as to block the opening of the housing 2.

Moreover, a rail 3a is provided movably in both side portions of the tray 3, and is held in a rail holding portion 3b provided integrally with the tray 3. In FIG. 1, the rail 3a is seen in only one of the side portions and the same rail is provided in the other side portion.

The optical pick-up module 4 has at least a spindle motor 5 for rotating and driving an optical disk, a cover 6 which is formed of a metal or a resin and is provided with an opening 6a from the spindle motor 5 to an outer periphery, and a carriage 7 having a part exposed from the opening 6a. The carriage 7 mounts a light source such as a high power laser diode, various optical members, an objective lens for constituting an optical spot on the optical disk, and an IC for driving the light source. The carriage 7 is held movably in a plurality of guide shafts (not shown) provided on the optical pick-up module 4, and furthermore, is moved to approach or separate from the spindle motor 5 by means of a feed motor (not shown).

Next, a structure around the avoiding portion 3i will be described in detail. The avoiding portion 3i is provided over almost a width B of the optical pick-up module 4 in order to avoid a collision with the optical pick-up module 4 in a step portion 3h. Moreover, the avoiding portion 3i forms a part of the opening 3c. The optical pick-up module 4 enters a back face 3j side of the optical disk attachment region outside portion 3e through the avoiding portion 3i (see FIG. 4). In a portion in which the optical pick-up module 4 enters the back face 3j side of the optical disk attachment region outside portion 3e, accordingly, the optical pick-up module 4 and the back face 3j of the optical disk attachment region outside portion 3e are opposed to each other and the opening 6a and the back face 3j are opposed to each other.

The optical pick-up module 4 is usually fixed to the tray 3 through a damper in order not to receive a vibration from an outside. Therefore, the optical pick-up module 4 might be slightly moved with respect to the tray 3. Accordingly, the avoiding portion 3i is provided to avoid a collision, and furthermore, a slight spacing is provided between the back face 3j of the optical disk attachment region outside portion 3e and the optical pick-up module 4.

The back face 3j of the optical disk attachment region outside portion 3e is provided with a concave portion 3l having an opening portion 3k on the step portion 3h. The opening portion 3k is provided on the step portion 3h in addition to the avoiding portion 3i.

The concave portion 3l takes an almost triangular shape seen in the direction of the rotating axis of the disk. A side wall corresponding to one of the sides of the concave portion 3l is provided nearly along a part of an almost circular tangential line in the case in which the optical disk attachment region portion 3d is seen in the direction of the rotating axis of the disk, that is, a tangential line extended in the direction of the rotation of the disk from a contact point (F in FIG. 3). The other side corresponds to a part of a circular arc taking an almost circular shape in the case in which the step portion 3h is seen in the direction of the rotating axis of the disk (H in FIG. 3) and the opening portion 3k is provided in this part. A side wall corresponding to a residual side is provided along a part of a straight line passing through the center of the rotation of the spindle motor 5 in the vicinity of the opening 6a (G in FIG. 3). Moreover, the concave portion 3l forms a bottom wall 3n which is almost flat except for a peripheral portion. Referring to the shape of the side wall, an inclined surface 3p linked from the bottom wall 3n is provided in a portion disposed along a part (G in FIG. 3) of the straight line passing through the center of the rotation of the spindle motor 5 in the vicinity of the opening 6a at one of the sides of the almost triangular shape.

As shown in FIG. 6 to be a DD' sectional view of FIG. 5, the bottom wall 3n constitutes a clearance together with the optical disk attachment region portion 3d or the cover 6 of the optical pick-up module 4, and the opening portion 3k is formed on the step portion 3h. At least the outer edge portion of a label plane 9b (an opposite surface to a surface which is opposed to the optical disk attachment region portion 3d) of an optical disk 9 is present within the clearance in the direction of the rotating axis of the optical disk in the attachment of the optical disk. Alternatively, the bottom wall 3n is disposed on almost the level with the label plane 9b of the optical disk 9 in the attachment of the optical disk or is provided apart from the optical disk attachment region portion 3d in the direction of the rotating axis of the disk as compared with the label plane 9b. Preferably, the bottom wall 3n is disposed apart from the optical disk attachment region portion 3d in the direction of the rotating axis of the disk as compared with the label plane 9b and a gap E is provided between the bottom wall 3n and the label plane 9b in the direction of the rotating axis of the disk.

On the other hand, a protruded portion 3m is provided on the surface side of the optical disk attachment region outside portion 3e. The protruded portion 3m is provided at least more widely than the range of the concave portion 3l of the back face 3j with the tray 3 seen in the direction of the rotating axis of the disk, and the shape of the protruded portion 3m is set in such a manner that a thickness between the concave portion 3l of the back face 3j and the protruded portion 3m has a predetermined value in the thinnest portion. Furthermore, the height of the protruded portion 3m is so set as not to collide with at least the housing 2 when the tray 3 is accommodated in the housing 2. In addition, a thickness between the concave portion 3l of the back face 3j and the protruded portion 3m is set in consideration of a strength and a workability. For example, in the case in which the whole tray is to be constituted by a molded product obtained by injection molding, it is desirable that the thickness of the thinnest portion should be equal to or greater than 0.5 mm in consideration of a molding property.

The protruded portion 3m may be constituted separately from the tray 3. More specifically, the protruded portion 3m may be formed by a separate component and be stuck into a predetermined position. In this case, it is also possible to reduce a thickness while ensuring a strength by properly setting the material of the protruded portion 3m. Therefore, a reduction in the thickness of a product can be achieved still more.

While the end of the opening 6a of the cover 6 which is provided on the bezel 8 side takes a rectangular shape in the conventional art, it is larger than the other portions in the vicinity of an opposed portion to the back face 3j to form an enlarged portion 6b in the embodiment.

By such a structure, an air flow generated by the optical disk rotated through the spindle motor 5 is comparatively strong in the outer peripheral portion of the optical disk, and furthermore, efficiently flows into a region (a space interposed between the tray 3 and the housing portion 2b) on the opposite side to the optical disk attachment side of the tray 3 through the opening portion 3k. Since the carriage 7 mounting a high power light source and an IC for driving the light source is present in the region on the opposite side, air is diffused by the invasion of the air flow. Consequently, the light source can be cooled effectively. Moreover, the air flow generated by the rotated optical disk is blown out strongly in the direction of the tangential line of the optical disk at the outer peripheral end of the optical disk and the direction of the rotation thereof. It is possible to efficiently pick up the air flow as shown in an arrow A in FIG. 5 by a portion which is almost coincident with a part of a tangential line extended in the direction of the rotation of the disk which takes the shape of the concave portion 3l. Moreover, the inclined surface 3p is provided. Consequently, it is possible to change the direction of the air flow entering from the opening portion 3k and efficiently leading the same air flow from the opening 6a to the region of the tray 3 which is provided on an opposite side to the optical disk attachment side.

Furthermore, the enlarged portion 6b is formed. Therefore, the air flow can be further efficiently led to the region of the tray 3 which is provided on an opposite side to the optical disk attachment side. It is desirable that the opening 6a should be formed in the vicinity of an opposed portion to the back face 3j so as not to be exposed from a surface. Consequently, it is possible to reduce a user's touch with the precision components of the optical pick-up module 4.

The inclined surface 3p has the function described above. Therefore, it is desirable that the whole or most of the inclined surface 3p should be present within the opening 6a as seen in the direction of the rotating axis of the disk. It is desirable that the end (G in FIG. 3) of the inclined surface 3p should be provided within the opening 6a or in the vicinity of the edge portion of the opening 6a as seen in the direction of the rotating axis of the disk. Consequently, the air flow collides with the inclined surface 3p and thus changes a direction as shown in the arrow A in the CC' sectional view of FIG. 5. Thus, the air flow can be led to the opening 6a more efficiently.

Furthermore, a spacing between the label plane 9b of the optical disk and the back face of the housing 2 is larger than a spacing between the data plane 9a of the optical disk and the optical disk attachment region portion 3d, and an air layer is large. Therefore, the air flow generated on the outer peripheral end of the optical disk by the optical disk which is rotated tends to be stronger close to the label plane 9b than the data plane 9a in the direction of the rotating axis. On the other hand, in the embodiment according to the invention, the bottom wall 3n is provided on almost the level with the label plane 9b (which is the opposite surface to the data plane 9a) of the optical disk 9 in the attachment of the disk or is provided apart from the optical disk attachment region portion 3d in the direction of the rotating axis of the disk with respect to the label plane 9b. Accordingly, the strong air flow generated close to the label plane 9b on the outer peripheral end of the optical disk can be efficiently taken in through the opening portion 3k.

In contrast with the conventional structure, in the embodiment, it is apparent that the temperature of a portion including the light source and various optical members which are mounted on the carriage can be reduced by 4□ or more. More specifically, in the conventional art in which an air passage is simply constituted, it is hard to carry out effective cooling in the optical disk device 1 in which the central part of the housing 2 has a thickness of 14 mm or less or 10 mm or less. By the structure according to the embodiment, an air flow generated on the optical disk can be led very effectively to the space between the housing portion 2b accommodating most of the carriage 7 and the tray 3. Consequently, it is possible to obtain a very high cooling performance.

The shape of the concave portion 3l seen in the direction of the rotating axis of the disk includes at least the opposed portion to the opening 6a, and it is possible to take an optional shape extended in an opposite direction to the direction of the rotation of the disk from the opposed portion to the opening 6a. The opening portion 3k is also extended in the opposite direction to the direction of the rotation of the disk from the opposed portion to the opening 6a. With these shapes, it is possible to lead the air flow generated by the rotated optical disk more effectively than that in the conventional art. In FIG. 7, the inclined surface 3p is provided across the opening 6a so that the air flow can be led effectively.

Furthermore, FIG. 8 is a view showing an air flow. It is apparent that the air flow efficiently passes through the opening portion 3k and the opening 6a and enters a region L2 in which most of the carriage 7 mounting a light source and a driving IC thereof is present when the optical disk is rotated in a region L1 between the cover 6 and the housing portion 2a, and the air flow (an arrow in FIG. 6) stirs the air in the region L2 effectively and sufficiently. As shown in FIG. 6, it is apparent that the air flow collides with the other members of the optical pick-up module 4 in the region L2 so that an air flow toward the spindle motor 5 is generated. Accordingly, the air flow can be generated in the direction of the movement of the carriage 7. Consequently, the air flow can be always caused to hit on the carriage so that a cooling efficiency can be enhanced.

While the air has been used as a gas flow in the embodiment, other gases may be used.

The optical disk device according to the invention can efficiently circulate the air flow. In particular, therefore, a countermeasure can be taken against heat in an optical disk device which is thin and small-sized. Thus, it is possible to obtain such an advantage as to eliminate a drawback such as a deterioration in a recording and reproducing characteristic which is caused by the heat. Thus, the invention can be adapted to electronic equipment such as a personal computer or a notebook computer.

Second Embodiment

An embodiment of an optical disk device according to the second embodiment of this invention will be described below.

Figure 10:
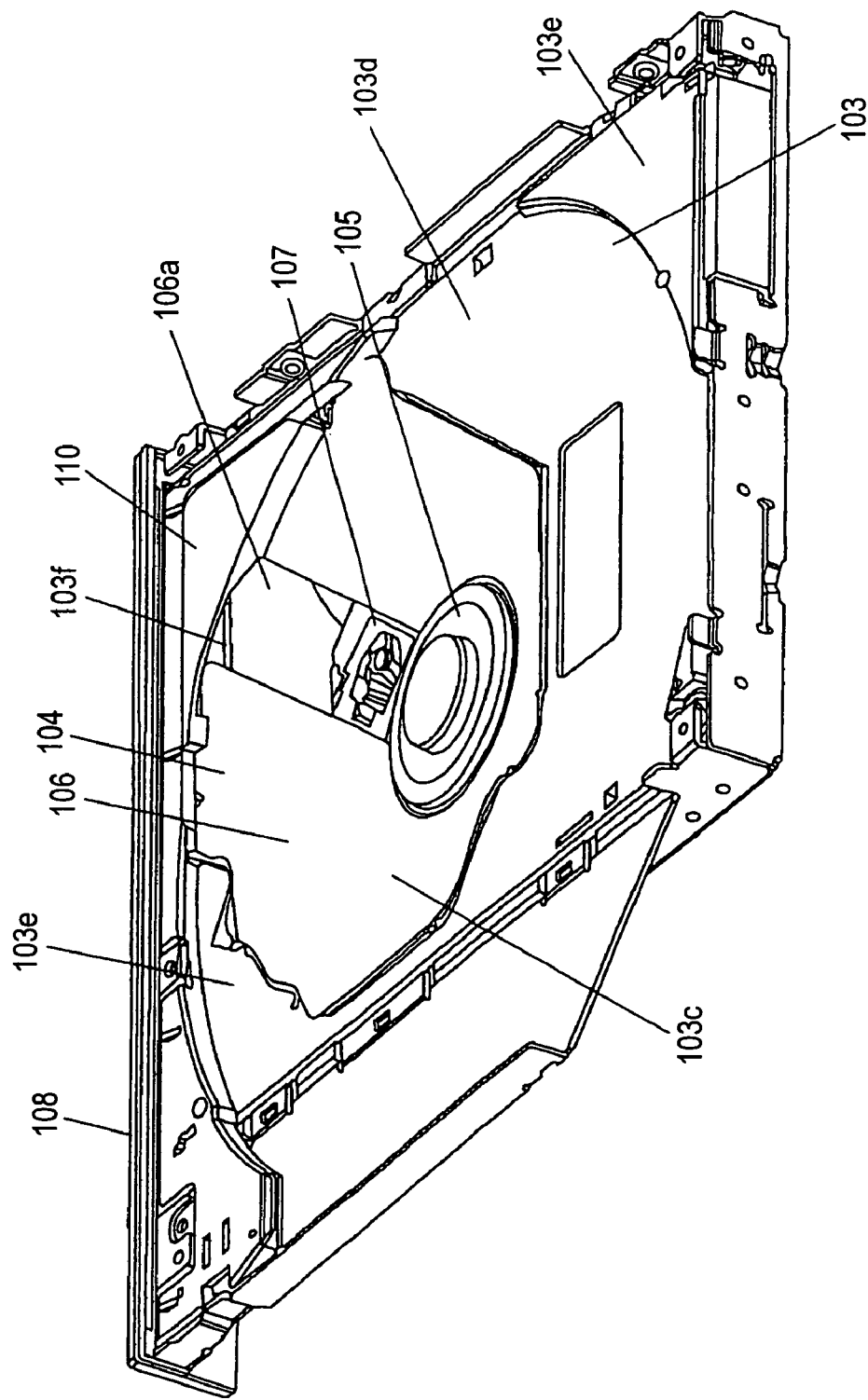
FIG. 10 is a perspective view showing an embodiment of the invention.
Figure 11:
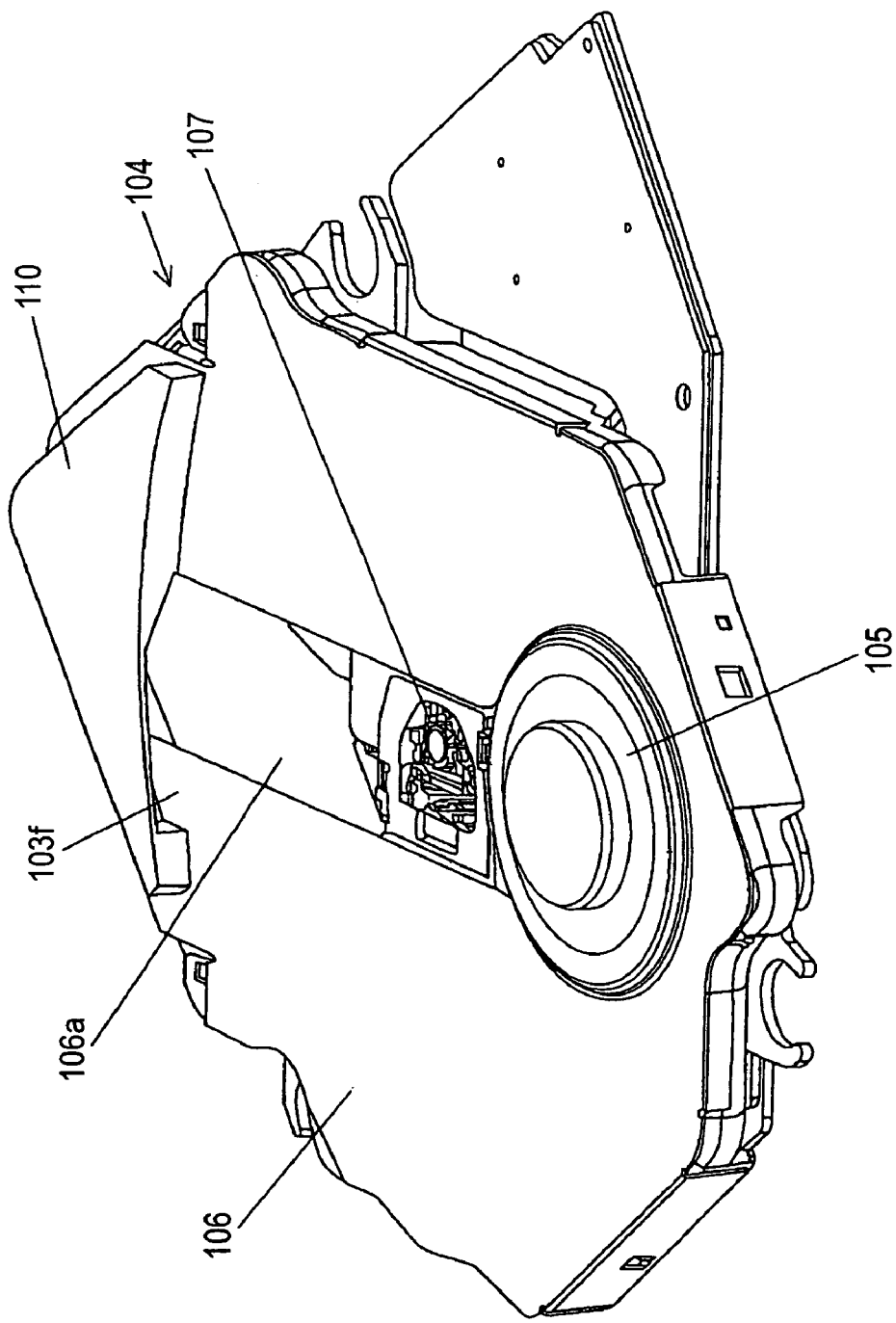
FIG. 11 is a perspective view showing an optical pick-up module in an optical disk device according to the embodiment of the invention.
Figure 12:
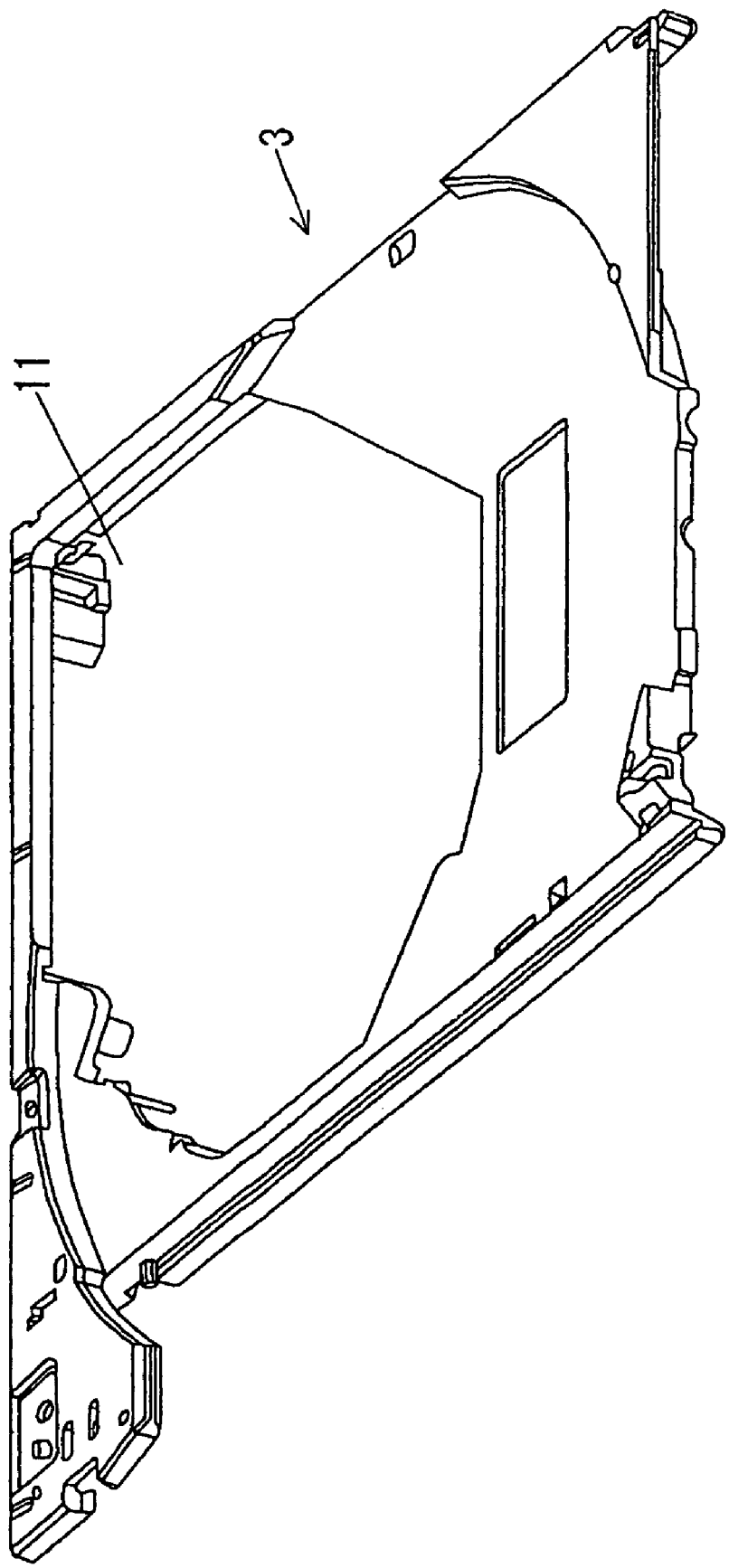
FIG. 12 is a perspective view showing a tray in the optical disk device according to the embodiment of the invention, FIGS. 13($a$) and 13($b$) are views showing a passage for an air flow in the optical disk device according to the embodiment of the invention.
Figure 13:
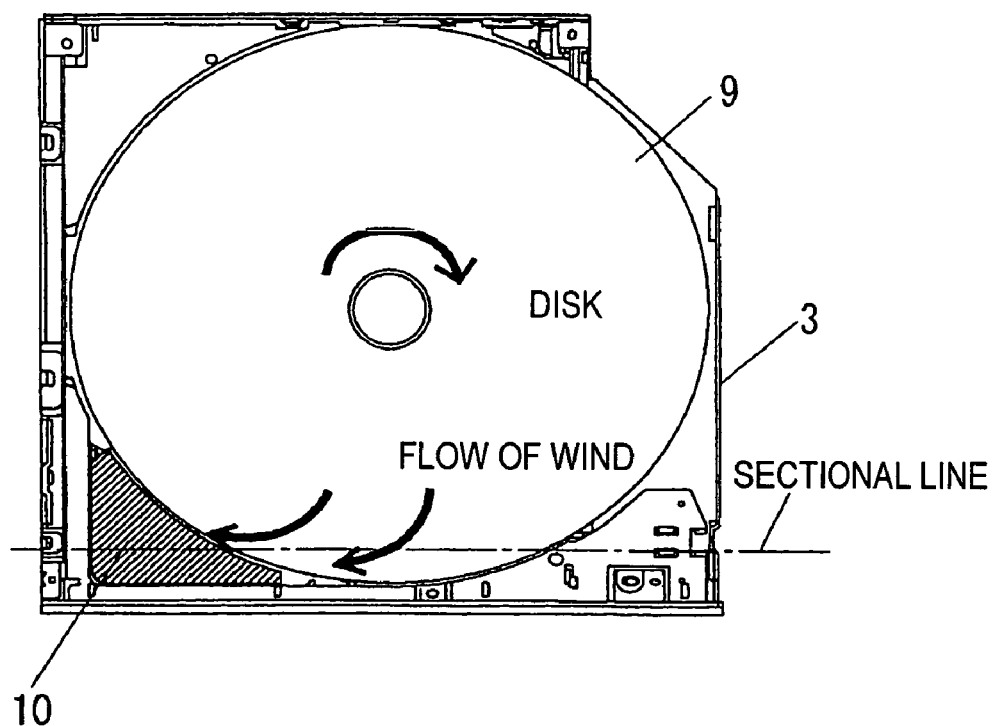
Figure 13:
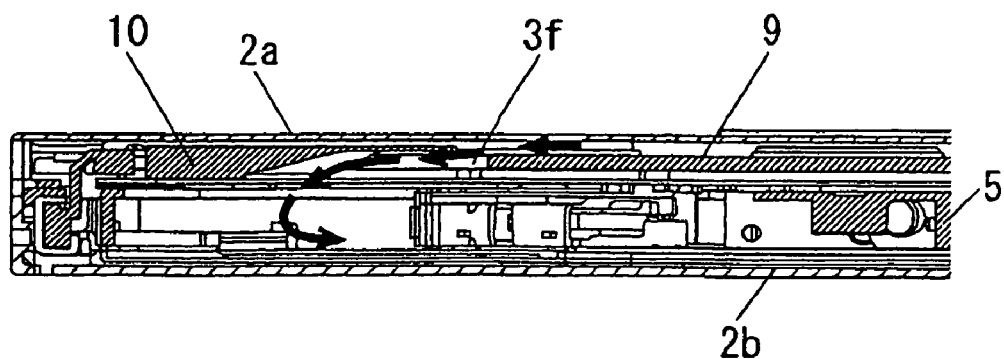

FIG. 10 is a perspective view showing an optical disk device according to an embodiment of the invention, FIG. 11 is a perspective view showing an optical pick-up module, FIG. 12 is a perspective view showing only a tray, and FIG. 13 is a view showing an air flow in the optical disk device according to the embodiment of the invention. For explanation, FIG. 10 shows a state in which the upper part of a housing is removed.

A tray 103 is constituted by a frame formed of a resin. An optical disk attachment region portion 103d is provided in the part of the tray 103 which is opposed to a disk in the attachment of the disk, and an outer periphery takes a circular shape corresponding to the shape of the optical disk. An optical disk attachment region outside portion 103e is provided on the outside of the optical disk attachment region portion 103d, and the optical disk attachment region portion 103d is provided with a concave portion which is concaved from the optical disk attachment region outside portion 103e by approximately 1.5 mm to 4 mm (which is equal to or slightly greater than the thickness of the optical disk to be attached).

In the embodiment, it is assumed that that the tray 103 takes an almost square shape and an optical disk having a maximum diameter to be attached is disk-shaped. Therefore, the optical disk attachment region portion 103d takes an almost circular shape as described above, and furthermore, the diameter of the optical disk attachment region portion 103d is equal to the diameter of the optical disk having the maximum diameter which might be attached or is greater than the same diameter by 1 mm to 7 mm. The optical disk attachment region outside portion 103e takes an almost triangular shape. Moreover, the optical disk attachment region portion 103d indicates a region including an opposed portion to the optical disk and having a slight clearance in an outer peripheral portion in the attachment of the optical disk, and the optical disk attachment region outside portion 103e indicates a region which is not opposed to the main surface of the optical disk at all.

An opening 103c is provided on the optical disk attachment region portion 103d, and an optical pick-up module 104 is inserted from a back face and is thus attached to the opening 103c.

A spindle motor 105 is provided on almost the center of the optical disk attachment region portion 103d. At least a part of the spindle motor 105 is protruded from the opening 103c, and furthermore, a carriage 107 and a cover 106 are also exposed.

Figure 9:
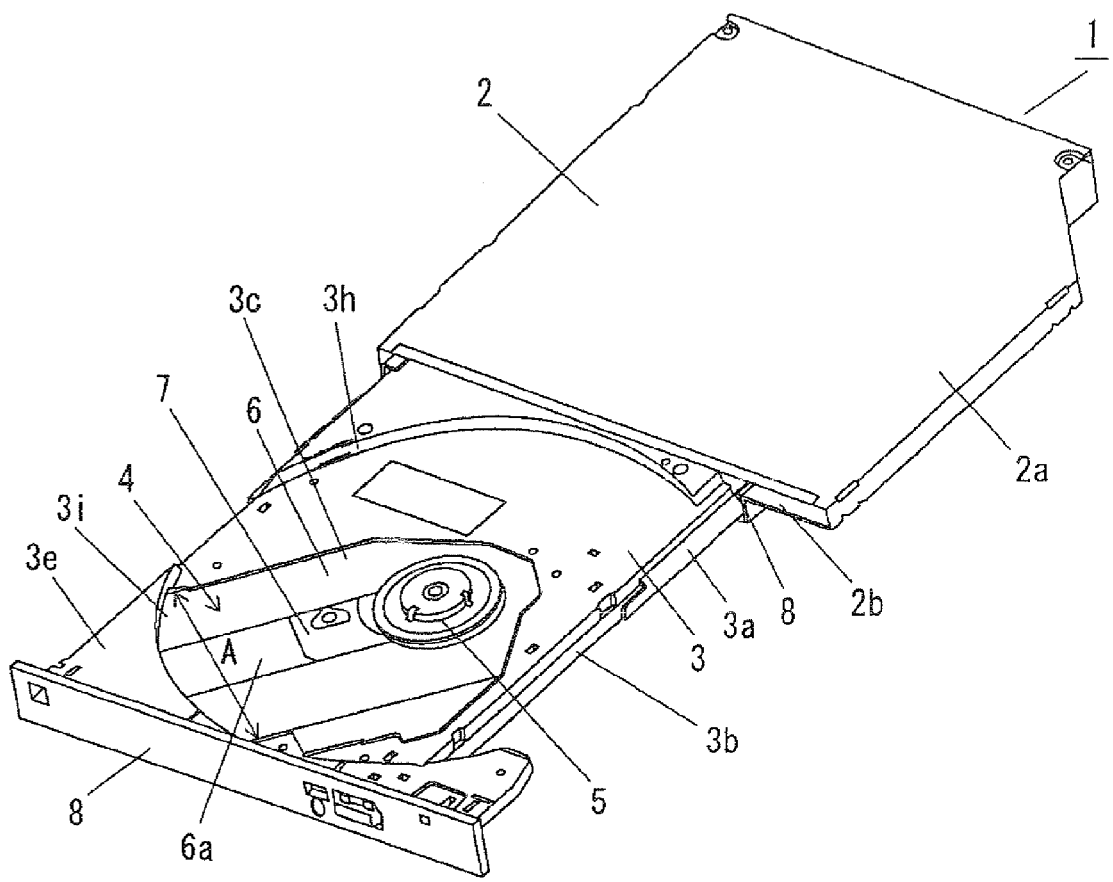
FIG. 9 is a perspective view showing a conventional optical disk device.

Moreover, a rail 103a is provided movably in both side portions of the tray 103 in the same manner as that shown in FIG. 9, and is held in a rail holding portion 103b provided integrally with the tray 103.

The optical pick-up module 104 has at least a spindle motor 105 for rotating and driving an optical disk, a cover 106 which is formed of a metal or a resin and is provided with an opening 106a from the spindle motor 105 to an outer periphery, and a carriage 107 having a part exposed from the opening 106a. The carriage 107 mounts a light source such as a high power laser diode, various optical members, an objective lens for constituting an optical spot on the optical disk, and an IC for driving the light source. The carriage 107 is held movably in a plurality of guide shafts (not shown) provided on the optical pick-up module 104, and furthermore, is moved to approach or separate from the spindle motor 105 by means of a feed motor (not shown).

108 denotes a bezel provided on the front end face of the tray 103. The bezel 108 is constituted to have such a size as to block the opening of the housing 102.

In the embodiment according to the invention, in the tray 103, a portion in the optical disk attachment region outside portion 103e on the bezel 108 side which is opposed to the opening 106a when the optical pick-up module 104 is to be attached is set to be an opening 111 on which a surface is not formed as shown in FIGS. 10, 11 and 12. The optical pick-up module 104 is provided with a gas introducing member 110 above the opening 6a in a position corresponding to a place disposed above the opening 111. The gas introducing member 110 is formed as a separate and independent member from the tray 103 and the optical pick-up module 104, and an opening 103f is provided on an opposed side to the opening 106a.

The portion in the optical disk attachment region outside portion 103e on the bezel 108 side which is opposed to the opening 106a is set to be the opening 11 and the gas introducing member 110 having the opening 103f is provided. Although the opening 106a is not exposed from the optical disk attachment region outside portion 103e in the conventional structure, consequently, the opening 106a is exposed from the optical disk attachment region outside portion 103e opposed to the opening 106a in the embodiment.

FIG. 13 shows a passage for air which is implemented by this structure. FIG. 13(a) is a plan view seen from the housing portion 102a side and FIG. 13(b) is a sectional view taken along a sectional line shown in FIG. 13(a). An air flow generated by the optical disk 109 rotated by means of the spindle motor 105 is comparatively strong in the outer peripheral portion of the optical disk 109. In addition, the air flow passes through the opening 106a along the wall surface of the gas introducing member 110 from the opening 103f provided on the gas introducing member 110 and efficiently flows into the region of the tray 103 which is provided on an opposite side to the optical disk attachment side (a space interposed between the tray 103 and the housing portion 102b). The carriage 107 mounting the high power light source and the driving IC for the light source is present in the region provided on the opposite side. Consequently, the air is diffused by the entrance of the air flow. Thus, the light source can be cooled effectively.

With this structure, in the case in which the optical disk 109 is attached and the tray 103 is accommodated in the housing 102, air in a portion having a comparatively low temperature between the housing portion 102a and the optical disk 109 can also be led effectively into the part between the housing portion 102b and the tray 103 by the rotation of the optical disk 109. Consequently, a cooling effect can be enhanced.

In contract with the conventional structure, it was found that the temperatures of the portion including the light source and various optical members which are mounted on the carriage 107 can be reduced by 4° C. or more in the embodiment. More specifically, in a structure in which an air passage is simply constituted as in the conventional art, it is hard to carry out effective cooling in the optical disk device 101 including the central part of the housing 102 having a thickness of 14 mm or less or 10 mm or less. By the structure according to the embodiment, however, the air flow generated on the optical disk 109 can be led very effectively to the space between the housing portion 102b for accommodating most of the carriage 107 and the tray 103. Thus, it is possible to obtain a very high cooling performance.

In the embodiment, the opening 103f is provided on the optical disk attachment region outside portion 103e so as to be linked to the optical disk attachment region portion 103d, and the outer peripheral portion of the attached optical disk 109 and the opening 103f can be constituted to be very close to each other (at a distance of 10 mm or less). Therefore, the air flow can be led effectively.

In the embodiment, moreover, the opening 103f is provided between the optical disk attachment region portion 103d and the front end face side of the tray 103, that is, the end on the side on which the bezel 108 is provided. Furthermore, the opening 106a is also formed between the spindle motor 105 and the end of the tray 103 on which the bezel 108 is provided. In addition, the longitudinal direction of the opening 106a is provided to be inclined non-perpendicularly to the bezel 108. Thus, the opening 103f is provided on the bezel 108 side of the tray 103. Consequently, the housing 102 portion is usually accommodated in electronic equipment such as a personal computer and the bezel 108 side is provided on the outside of the electron equipment. Consequently, the cooled air can be caused to flow in comparatively easily.

FIGS. 14 to 17 show examples of external walls 103g and 103h for forming the opening 103f to be provided on the gas introducing member 110.

Figure 14:
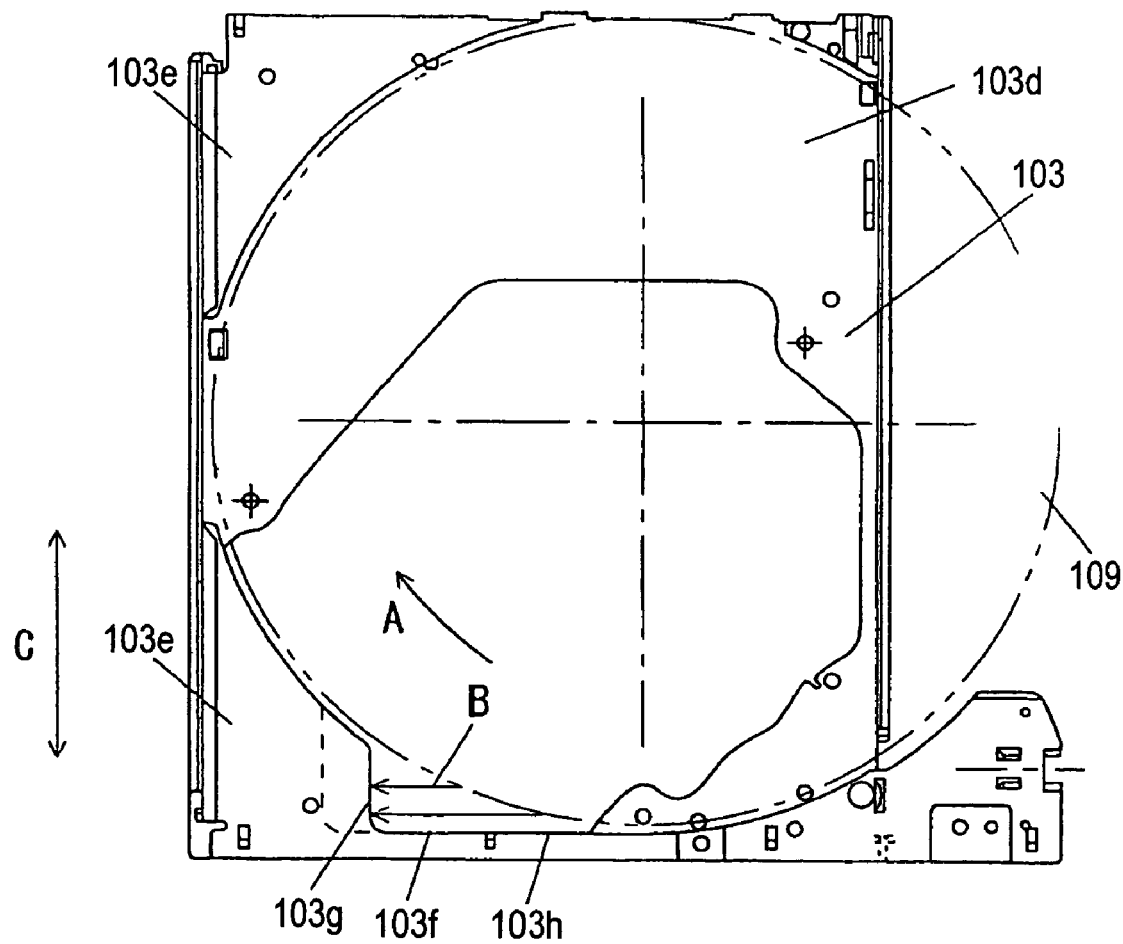
FIG. 14 is a plan view showing a state in which the tray is pulled out in the optical disk device according to the embodiment of the invention.

As shown in FIG. 14, for example, when the optical disk 109 is rotated in the direction of an arrow A, an air flow is generated in the direction of B. The air flow B directly flows from the opening 103f into a portion between the tray 103 and the housing portion 102b, and furthermore, the air flowing along the external wall 103h is blocked by the external wall 103g and thus flows into the portion between the tray 103 and the housing portion 102b through the opening 103f.

Figure 15:
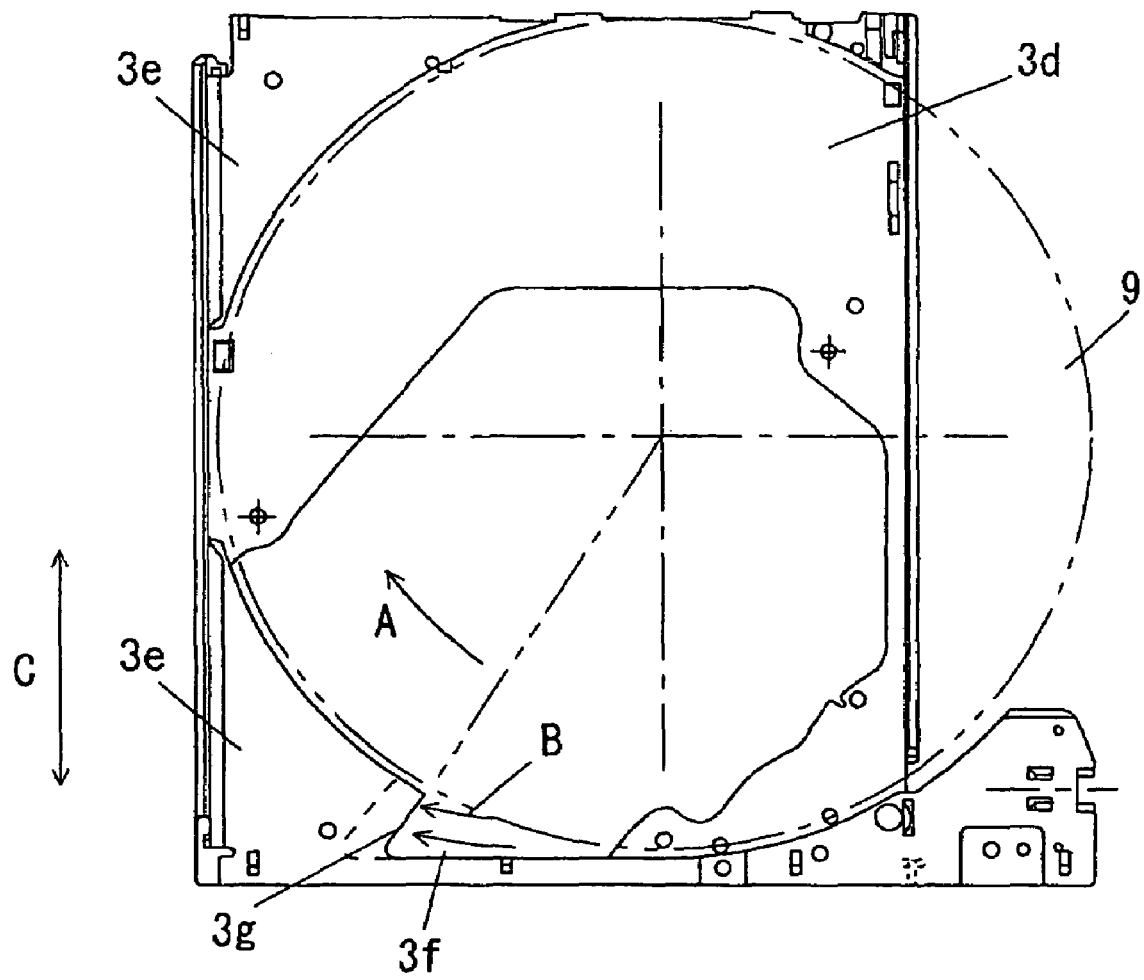
FIG. 15 is a plan view showing the state in which the tray is pulled out in the optical disk device according to the embodiment of the invention.
Figure 16:
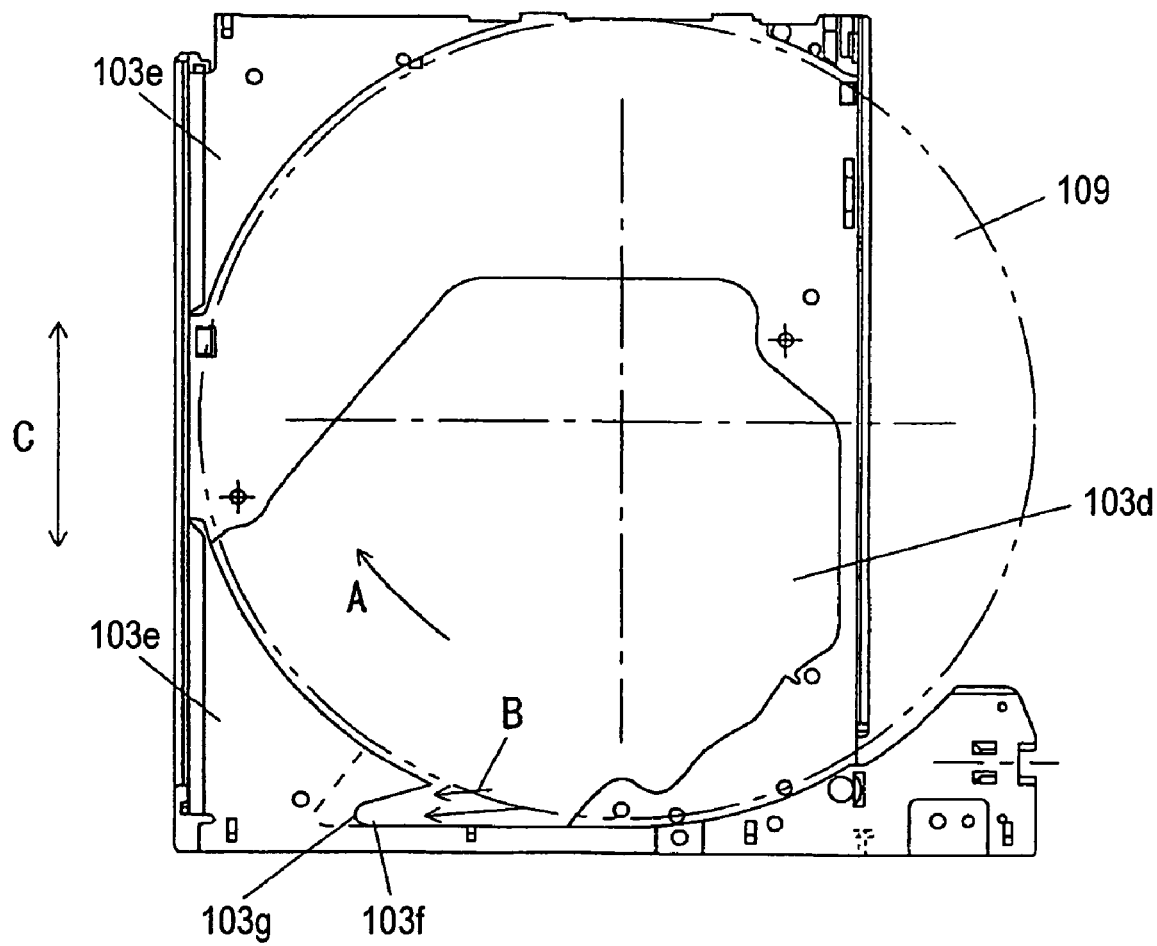
FIG. 16 is a plan view showing the state in which the tray is pulled out in the optical disk device according to the embodiment of the invention.
Figure 17:
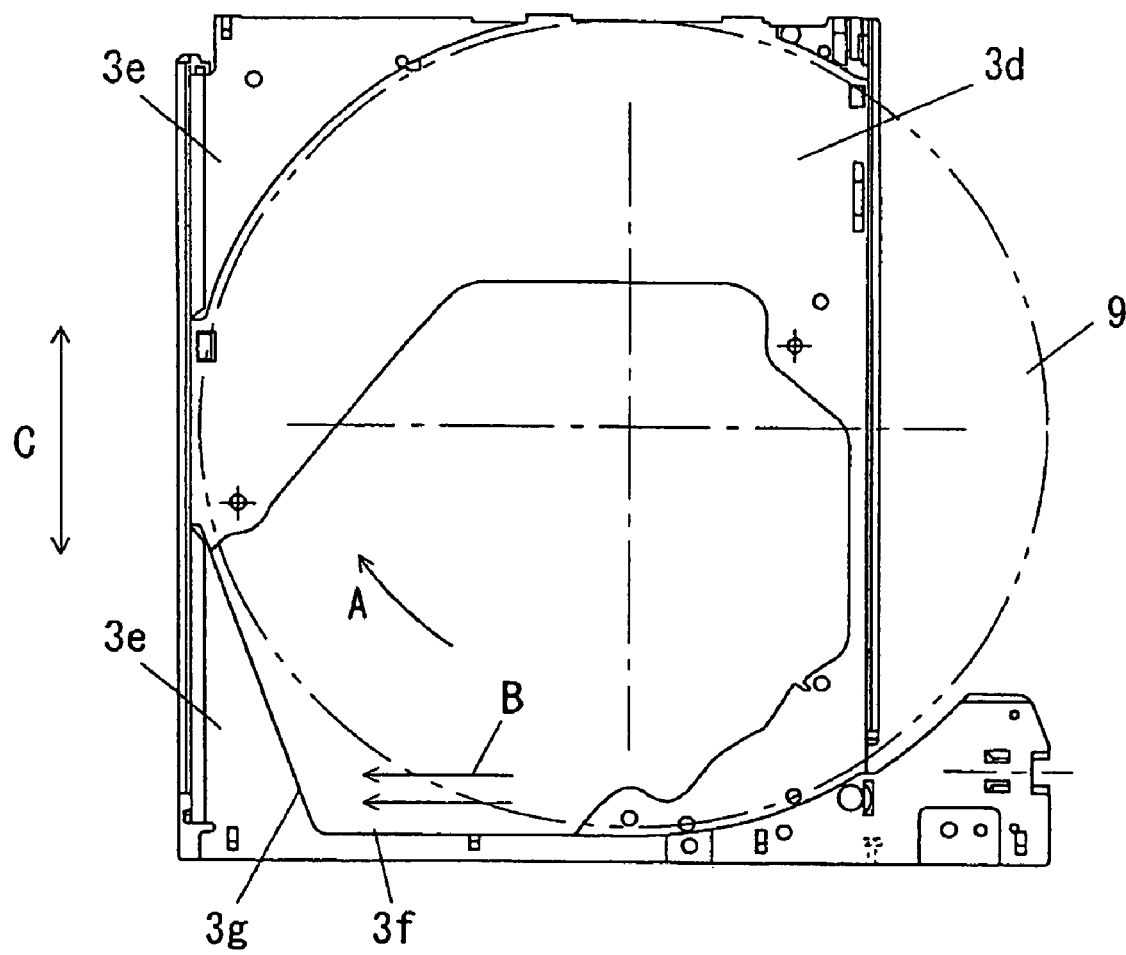
FIG. 17 is a plan view showing the state in which the tray is pulled out in the optical disk device according to the embodiment of the invention.

The external wall 103g may be formed in almost parallel with a direction C in which the tray 103 is accommodated in the housing 102 as shown in FIG. 14 or may be formed in almost parallel with a straight line passing through the center of the rotation of the optical disk 109 as shown in FIG. 15. Moreover, the external wall 103g may take a concave shape as shown in FIG. 16 or may be formed with an inclination in such a manner that the width of the optical disk attachment region outside portion 103e is gradually reduced when it approaches the side portion of the tray 103 as shown in FIG. 17.

While the air has been used as a gas flow in the embodiment, other gases may be used.

The optical disk device according to the invention can efficiently circulate the air flow. In particular, therefore, a countermeasure can be taken against heat in an optical disk device which is thin and small-sized. Thus, it is possible to eliminate a drawback such as a deterioration in a recording and reproducing characteristic which is caused by heat. Thus, the invention can be applied to electronic equipment such as a personal computer or a notebook computer for utilization.

Third Embodiment

An embodiment of an optical disk device according to the third embodiment of the invention will be described below.

Figure 18:
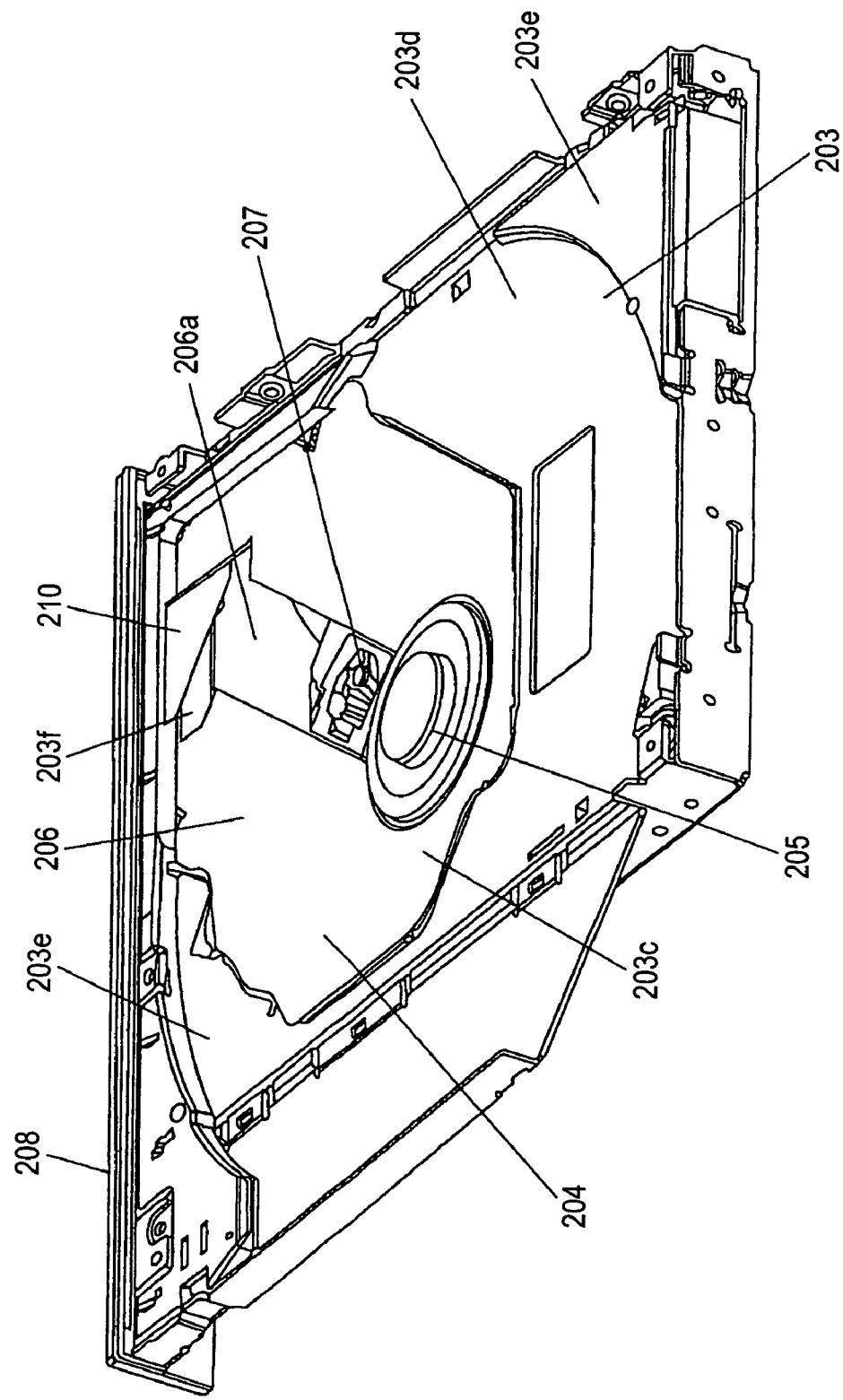
FIG. 18 is a perspective view showing an optical disk device according to an embodiment of the invention.
Figure 19:
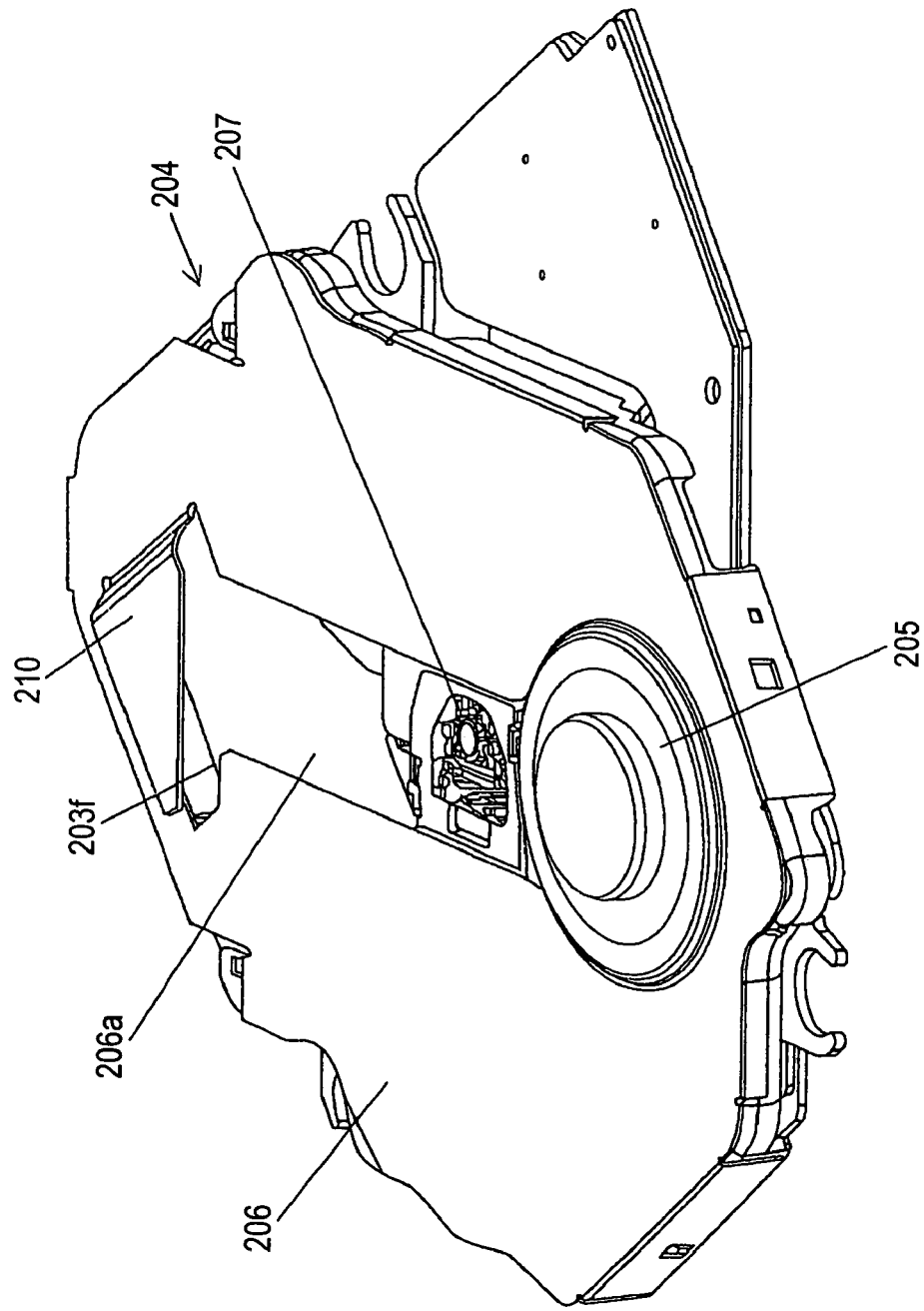
FIG. 19 is a perspective view showing an optical pick-up module in the optical disk device according to the embodiment of the invention.
Figure 20:
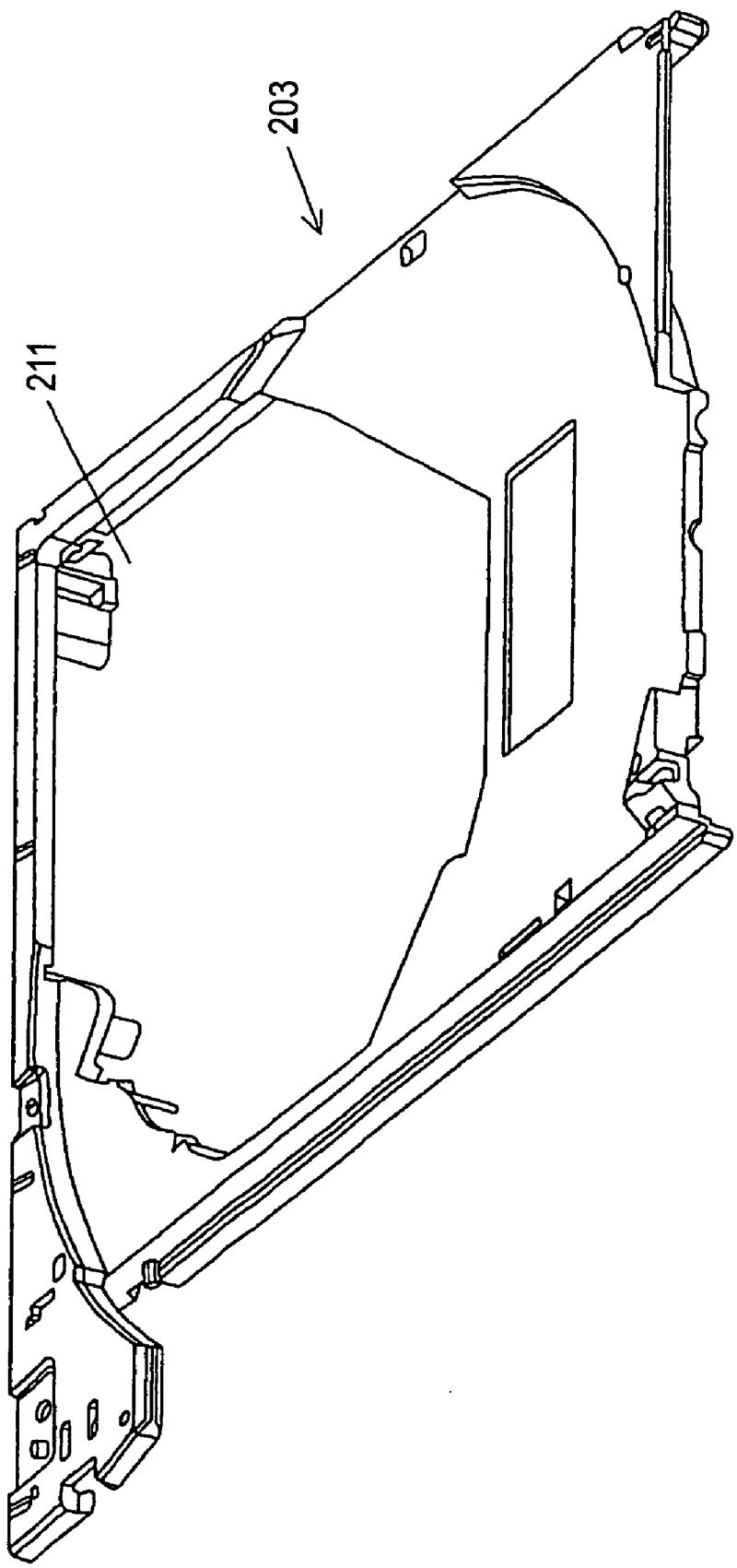
FIG. 20 is a perspective view showing a tray in the optical disk device according to the embodiment of the invention.
Figure 21:
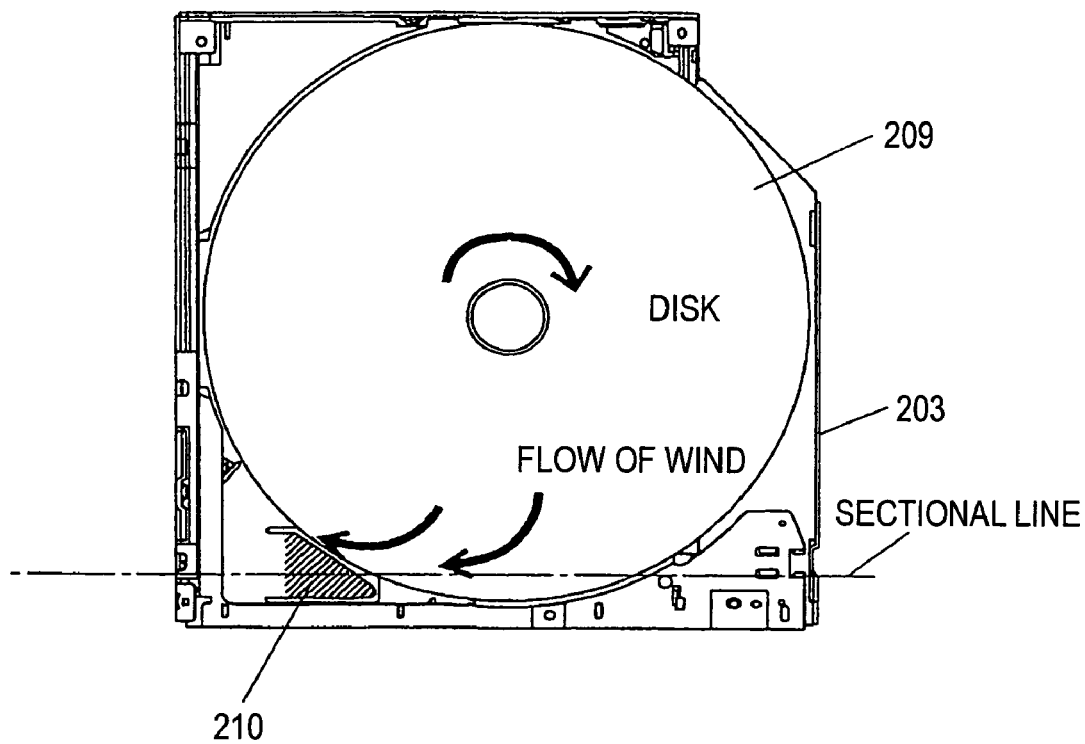
FIGS. 21(a) and 21(b) are views showing a passage for an air flow in the optical disk device according to the embodiment of the invention.
Figure 21:
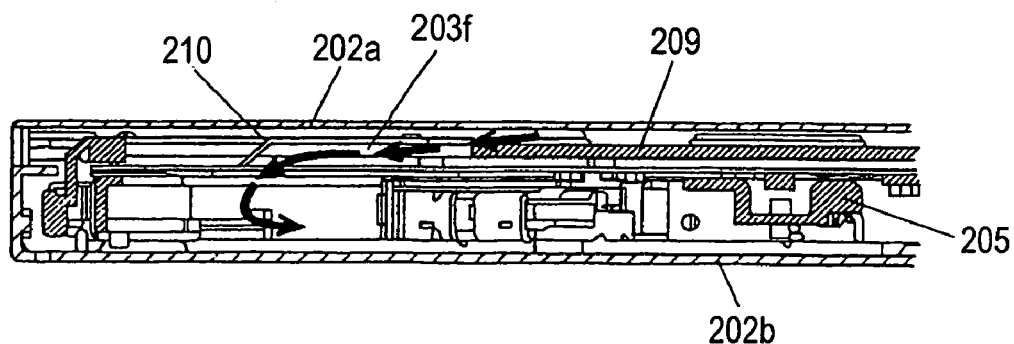

FIG. 18 is a perspective view showing an optical disk device according to an embodiment of the invention, FIG. 19 is a perspective view showing an optical pick-up module in the optical disk device according to the embodiment of the invention, FIG. 20 is a perspective view showing a tray in the optical disk device according to the embodiment of the invention, and FIG. 21 is a view showing a passage for an air flow in the optical disk device according to the embodiment of the invention. For explanation, FIG. 18 shows a state in which the upper part of a housing is removed.

A tray 203 is constituted by a frame formed of a resin. An optical disk attachment region portion 203d is provided in the part of the tray 203 which is opposed to a disk in the attachment of the disk, and an outer periphery takes a circular shape corresponding to the shape of the optical disk. An optical disk attachment region outside portion 203e is provided on the outside of the optical disk attachment region portion 203d, and the optical disk attachment region portion 203d is provided with a concave portion which is concaved from the optical disk attachment region outside portion 203e by approximately 1.5 mm to 4 mm (which is equal to or slightly greater than the thickness of the optical disk to be attached).

In the embodiment, it is assumed that that the tray 203 takes an almost square shape and an optical disk having a maximum diameter to be attached is disk-shaped. Therefore, the optical disk attachment region portion 203d takes an almost circular shape as described above, and furthermore, the diameter of the optical disk attachment region portion 203d is equal to the diameter of the optical disk having the maximum diameter which might be attached or is greater than the same diameter by 1 mm to 7 mm. The optical disk attachment region outside portion 203e takes an almost triangular shape. Moreover, the optical disk attachment region portion 203d indicates a region including an opposed portion to the optical disk and having a slight clearance in an outer peripheral portion in the attachment of the optical disk, and the optical disk attachment region outside portion 203e indicates a region which is not opposed to the main surface of the optical disk at all.

An opening 203c is provided on the optical disk attachment region portion 203d, and an optical pick-up module 204 is inserted from a back face and is thus attached to the opening 203c.

A spindle motor 205 is provided on almost the center of the optical disk attachment region portion 203d. At least a part of the spindle motor 205 is protruded from the opening 203c, and furthermore, a carriage 207 and a cover 206 are also exposed.

Moreover, a rail 203a is provided movably in both side portions of the tray 203 in the same manner as that shown in FIG. 9, and is held in a rail holding portion 203b provided integrally with the tray 203.

The optical pick-up module 204 has at least a spindle motor 205 for rotating and driving an optical disk, a cover 206 which is formed of a metal or a resin and is provided with an opening 206a from the spindle motor 205 to an outer periphery, and a carriage 207 having a part exposed from the opening 206a. The carriage 207 mounts a light source such as a high power laser diode, various optical members, an objective lens for constituting an optical spot on the optical disk, and an IC for driving the light source. The carriage 207 is held movably in a plurality of guide shafts (not shown) provided on the optical pick-up module 204, and furthermore, is moved to approach or separate from the spindle motor 205 by means of a feed motor (not shown).

208 denotes a bezel provided on the front end face of the tray 203. The bezel 208 is constituted to have such a size as to block the opening of the housing 202.

In the embodiment according to the invention, in the tray 203, a portion in the optical disk attachment region outside portion 203e on the bezel 208 side which is opposed to the opening 206a when the optical pick-up module 204 is to be attached is set to be an opening 211 on which a surface is not formed as shown in FIGS. 18, 19 and 20. The optical pick-up module 204 is provided with a protruded portion 210 obtained by erecting a part of the cover 206 of the optical pick-up module 204 in a position corresponding to a part disposed above the opening 211, and an opening 203f is provided on an opposed side to the opening 206a.

As another embodiment, moreover, the protruded portion 210 taking an erected shape is formed by welding or adhesion in the region of the cover 206 of the optical pick-up module 204 which is linked to the opening 206a in the position corresponding to the part disposed above the opening 211 when the optical pick-up module 204 is to be attached to the tray 203, and the opening 203f can also be provided on the opposed side to the opening 206a.

The portion in the optical disk attachment region outside portion 203e on the bezel 208 side which is opposed to the opening 206a is set to be the opening 211, the protruded portion 210 taking the erected shape is provided on the cover 206 of the optical pick-up module 204, and the opening 203f is provided on the opposed side to the opening 206a. Although the opening 206a is not exposed from the optical disk attachment region outside portion 203e in the conventional structure, consequently, the opening 206a is exposed from the optical disk attachment region outside portion 203e opposed to the opening 206a in the embodiment.

FIG. 21 shows a passage for air which is implemented by this structure. FIG. 21(a) is a plan view seen from the housing portion 202a side and FIG. 21(b) is a sectional view taken along a sectional line shown in FIG. 21(a). An air flow generated by the optical disk 209 rotated by means of the spindle motor 205 is comparatively strong in the outer peripheral portion of the optical disk 209. In addition, the air flow passes through the opening 206a along the lower surface of the protruded portion 210 from the opening 203f provided on the protruded portion 210 and efficiently flows into the region of the tray 203 which is provided on an opposite side to the optical disk attachment side (a space interposed between the tray 203 and the housing portion 202b). The carriage 207 mounting the high power light source and the driving IC for the light source is present in the region provided on the opposite side. Consequently, the air is diffused by the entrance of the air flow. Thus, the light source can be cooled effectively.

With this structure, in the case in which the optical disk 209 is attached and the tray 203 is accommodated in the housing 202, air in a portion having a comparatively low temperature between the housing portion 202a and the optical disk 209 can also be led effectively into the part between the housing portion 202b and the tray 203 by the rotation of the optical disk 209. Consequently, a cooling effect can be enhanced.

In contract with the conventional structure, it was found that the temperatures of the portion including the light source and various optical members which are mounted on the carriage 207 can be reduced by 4° C. or more in the embodiment. More specifically, in a structure in which an air passage is simply constituted as in the conventional art, it is hard to carry out effective cooling in the optical disk device 201 including the central part of the housing 202 having a thickness of 14 mm or less or 10 mm or less. By the structure according to the embodiment, however, the air flow generated on the optical disk 209 can be led very effectively to the space between the housing portion 202b for accommodating most of the carriage 207 and the tray 203. Thus, it is possible to obtain a very high cooling performance.

In the embodiment, moreover, the opening 203f is provided between the optical disk attachment region portion 203d and the front end face side of the tray 203, that is, the end on the side on which the bezel 208 is provided. Furthermore, the opening 206a is also formed between the spindle motor 205 and the end of the tray 203 on which the bezel 208 is provided. In addition, the longitudinal direction of the opening 206a is provided to be inclined non-perpendicularly to the bezel 208. Thus, the opening 203f is provided on the bezel 208 side of the tray 203. Consequently, the housing 202 portion is usually accommodated in electronic equipment such as a personal computer and the bezel 208 side is provided on the outside of the electron equipment. Consequently, the cooled air can be caused to flow in comparatively easily.

While the air has been used as a gas flow in the embodiment, other gases may be used.

The optical disk device according to the invention can efficiently circulate the air flow. In particular, therefore, a countermeasure can be taken against heat in an optical disk device which is thin and small-sized. Thus, it is possible to eliminate a drawback such as a deterioration in a recording and reproducing characteristic which is caused by the heat. Thus, the invention can be applied to electronic equipment such as a personal computer or a notebook computer for utilization.

Forth Embodiment

An embodiment of an optical disk device according to the forth aspect of the invention will be described below.

Figure 22:
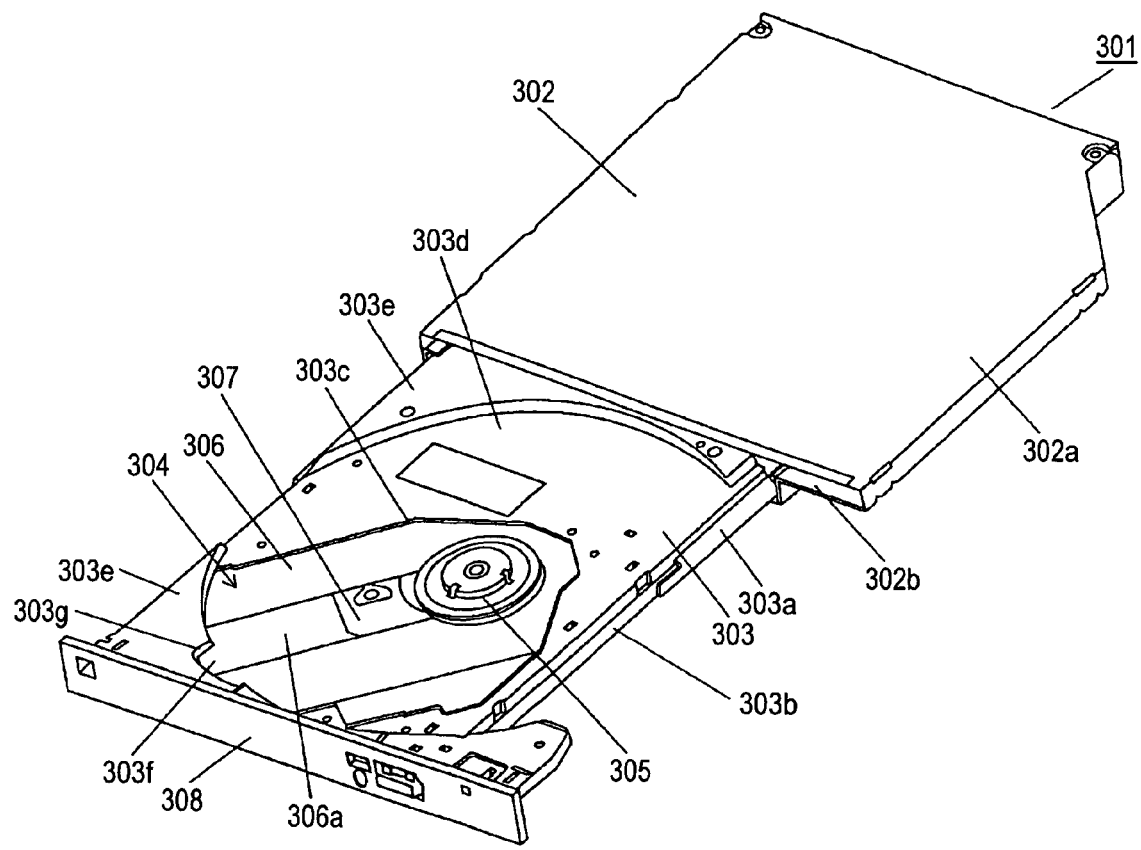
FIG. 22 is a perspective view showing an optical disk device according to an embodiment of the invention.

FIG. 22 is a perspective view showing an optical disk device according to an embodiment of the invention. In FIG. 22, 301 denotes an optical disk device. The optical disk device 301 has a housing 302 and a tray 303 held in the housing 302 to freely appear. The housing 302 has a bag-shaped structure in which metallic housing portions 302a and 302b are combined with each other, and the tray 303 appears from the opening of the housing 302.

It is preferable that the housing portion 302a and the housing portion 302b should be strongly fixed to each other by using engaging means and a spiral which are not shown. A conductive material such as a metal material, for example, iron, an iron alloy, aluminum, an aluminum alloy or a magnesium alloy is suitably used as the component of the housing 302. Moreover, it is also possible to use a component in which each housing portion is constituted by a resin material and a metal film having a high conductivity is formed thereon by using a method such as electrodeposition. Furthermore, the housing portions 302a and 302b may be constituted by a material of the same type respectively or materials of different types. Moreover, each of the main plane portions of the housing portions 302a and 302b has an average thickness of 0.3 mm to 1.6 mm. In the case in which the average thickness is comparatively small, the housing portion 302a and the housing portion 302b are constituted by metal materials, and a metal plate is formed by pressing, for example. In the case in which the average thickness is comparatively great, moreover, the housing portion 302a and the housing portion 302b are constituted by die casting (aluminum or a magnesium alloy).

The tray 303 is constituted by a frame formed of a resin and is provided with an opening 303c. An optical pick-up module 304 is attached to the tray 303 from a back face and is exposed from a surface through the opening 303c. Moreover, a rail 303a is provided movably in both side portions of the tray 303, and is held in a rail holding portion 303b provided integrally with the tray 303. In FIG. 22, the rail 303a is provided in only one of the side portions and the same rail is provided in the other side portion.

The optical pick-up module 304 has at least a spindle motor 305 for rotating and driving an optical disk, a cover 306 which is formed of a metal or a resin and is provided with an opening 306a from the spindle motor 305 to an outer periphery, and a carriage 307 having a part exposed from the opening 306a. The carriage 307 is held movably in a plurality of guide shafts provided on the optical pick-up module 304, and furthermore, is moved to approach or separate from the spindle motor 305 by means of a feed motor which is not shown.

At least a part of the spindle motor 305 is protruded from the opening 303c, and furthermore, the carriage 307 and the cover 306 are also exposed therefrom.

308 denotes a bezel provided on the front end face of the tray 303. The bezel 308 is constituted to have such a size as to block the opening of the housing 302.

An optical disk attachment region portion 3d is provided on the side of the tray 303 on which the spindle motor 305 is protruded, and an outer periphery takes a circular shape corresponding to the shape of the optical disk. An optical disk attachment region outside portion 303e is provided on the outside of the optical disk attachment region portion 303d and is constituted to be protruded from the optical disk attachment region portion 303d by approximately 1.5 mm to 4 mm (which is equal to or slightly greater than the thickness of the optical disk to be attached). In the embodiment, it is assumed that the tray 303 takes an almost square shape and an optical disk having a maximum diameter to be attached is disk-shaped. Therefore, the optical disk attachment region portion 303d takes an almost circular shape as described above, and furthermore, the diameter of the optical disk attachment region portion 303d is equal to the diameter of the optical disk having the maximum diameter which might be attached or is greater than the same diameter by 1 mm to 7 mm. The optical disk attachment region outside portion 303e takes an almost triangular shape. Moreover, the optical disk attachment region portion 303d indicates a region including an opposed portion to the optical disk and having a slight clearance in an outer peripheral portion in the attachment of the optical disk, and the optical disk attachment region outside portion 303d indicates a region which is not opposed to the main surface of the optical disk at all.

The spindle motor 305 is provided on almost the center of the optical disk attachment region portion 303d, and furthermore, the optical disk attachment region portion 303d is mainly formed by the surface of a part of the tray 303 and the surface of the cover 306.

Moreover, an opening 303f is provided on the optical disk attachment region outside portion 303e at the bezel 308 side. The opening 303f is constituted by an external wall 303g formed by the tray 303. Since a part of the optical pick-up module 304 is opposed to the optical disk attachment region outside portion 303e on the bezel 308 side, furthermore, a part of the opening 6a of the cover 306 is opposed thereto in the same manner.

The opening 303f is provided in the optical disk attachment region outside portion 303e on the bezel 308 side in order to be opposed to at least the opening 306a. More specifically, although the opening 306a is not exposed in the optical disk attachment region outside portion in the conventional structure, the opening 303f is provided so that the opening 306a is also exposed in the disk attachment region outside portion 303e in the embodiment.

By such a structure, an air flow generated on the optical disk rotated by the spindle motor 305 is comparatively strong in the outer peripheral portion of the optical disk, and furthermore, efficiently flows into a region (a space interposed between the tray 303 and the housing portion 302b) on the opposite side to the optical disk attachment side of the tray 303 through the opening 3f and the opening 306a. Since the carriage 307 mounting a high power light source and a driving IC for the light source is present in the region on the opposite side, air is diffused by the invasion of the air flow. Consequently, the light source can be cooled effectively.

It was found that the temperatures of the portion including the light source and various optical members which are mounted on the carriage are different from each other by 4° C. or more between the conventional structure in which the opening 303f is not provided and the embodiment. More specifically, in a structure in which an air passage is simply constituted as in the conventional art, it is hard to carry out effective cooling in the optical disk device including the central part of the housing 302 having a thickness of 14 mm or less or 10 mm or less as in the embodiment. However, the opening 303f is provided on the optical disk attachment region outside portion 303e in such a manner that at least a part is opposed to the opening 306a provided on the optical pick-up module 304. Consequently, the air flow generated on the optical disk can be led very effectively to a space between the housing portion 302b for accommodating most of the carriage 307 and the tray 303. Thus, it is possible to obtain a very high cooling performance.

With the structure, in the case in which the optical disk is attached and the tray 303 is accommodated in the housing 302, air in a portion having a comparatively low temperature between the housing portion 302a and the optical disk can also be led effectively to the space between the housing portion 302b and the tray 303 by the rotation of the optical disk. Consequently, it can be supposed that a cooling efficiency is high.

In the embodiment, the opening 303f is provided on the optical disk attachment region side of the optical disk attachment region outside portion 303e so as to be linked to the optical disk attachment region portion 303d, that is, the outer peripheral portion of the attached optical disk and the opening 303f are constituted to be very close to each other (at a distance of 10 mm or less). Consequently, the air flow can be led to other portions further effectively.

In the embodiment, moreover, the opening 303f is disposed between the optical disk attachment region portion 303d and the front end face side of the tray 303, that is, the end on the side on which the bezel 308 is provided. Furthermore, the opening 306a is also formed between the spindle motor 305 and the end of the tray 303 on which the bezel 308 is provided. In addition, the longitudinal direction of the opening 306a is provided to be inclined non-perpendicularly to the bezel 308. Thus, the opening 303f is provided on the bezel 308 side of the tray 303. Consequently, the housing 302 portion is usually accommodated in electronic equipment such as a personal computer and the bezel 308 side is provided on the outside of the electron equipment. Consequently, the cooled air can be caused to flow in comparatively easily.

Figure 23:
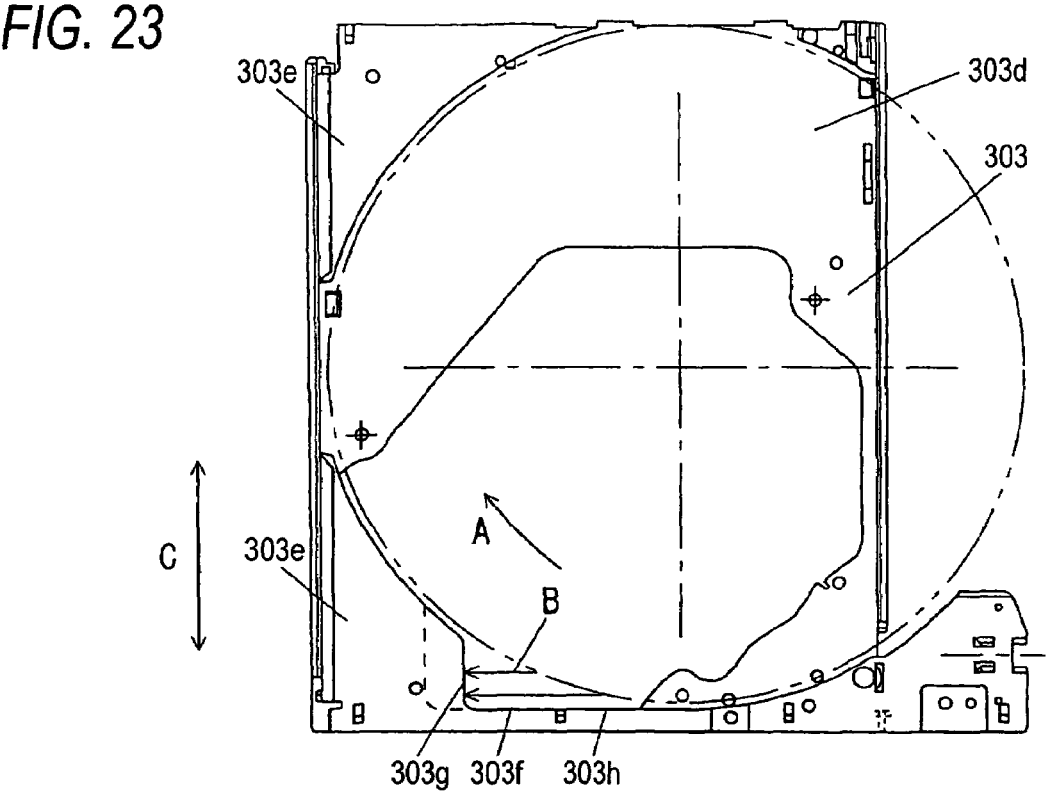
FIG. 23 is a plan view showing the optical disk device according to the embodiment of the invention.

As shown in FIG. 23, for the shape of the opening 303f, when the optical disk is rotated in a direction of an arrow A, the air flow is generated in a direction of B in the embodiment. The air flow B is blocked because the portion in which the air flow B directly flows from the opening 303f into a part between the tray 303 and the housing portion 302b and the external wall 303g are provided. Consequently, the air flow B effectively flows into the opening 303f. In the embodiment shown in FIG. 23, the external wall 303g is formed in almost parallel with a direction C in which the tray 303 is pulled out of the housing 302 or is accommodated therein. Moreover, it is a matter of course that an external wall 303h is present along the air flow B over the external wall constituting the opening 303f.

Figure 24:
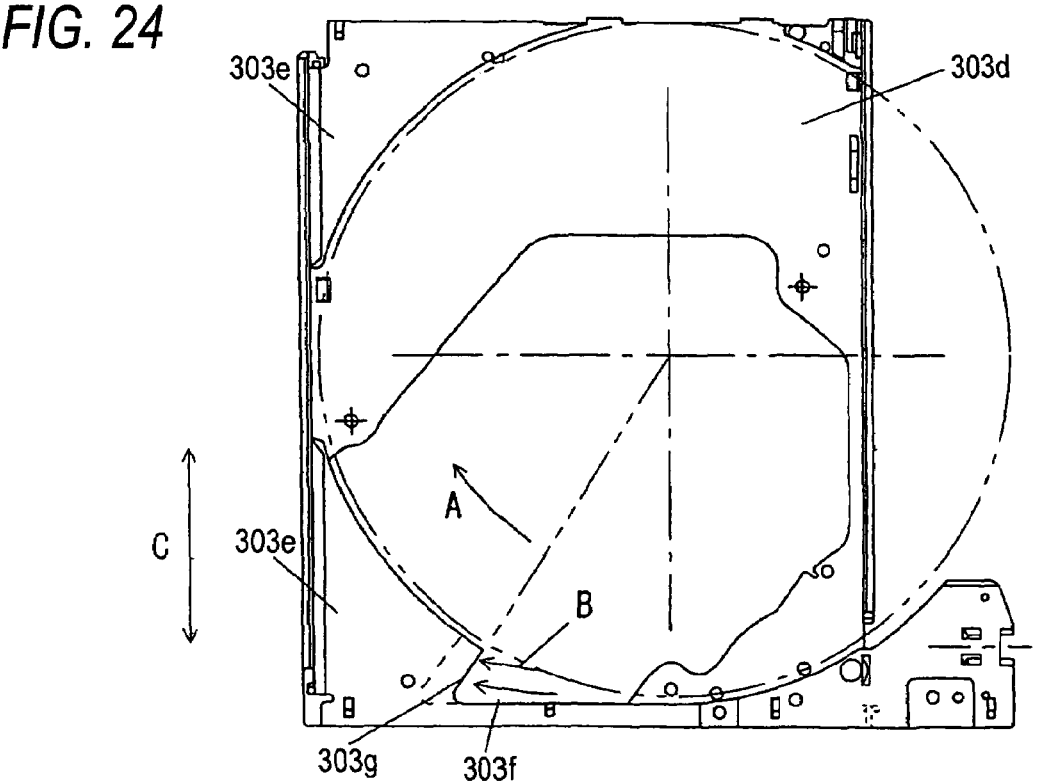
FIG. 24 is a plan view showing the optical disk device according to the embodiment of the invention.
Figure 25:
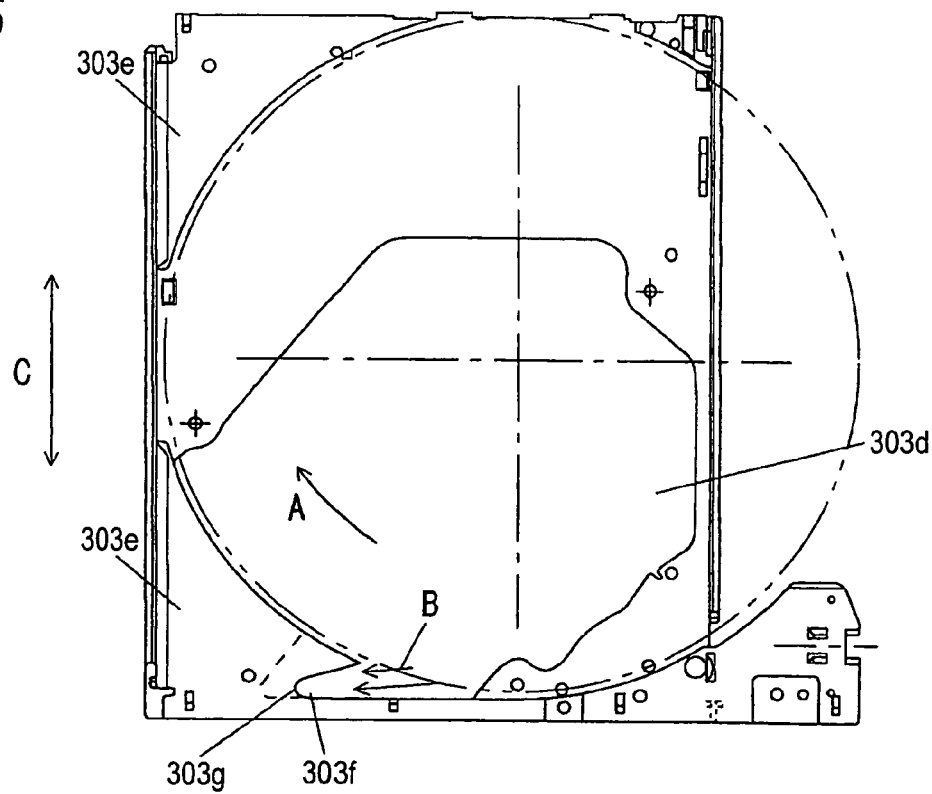
FIG. 25 is a plan view showing the optical disk device according to the embodiment of the invention.
Figure 26:
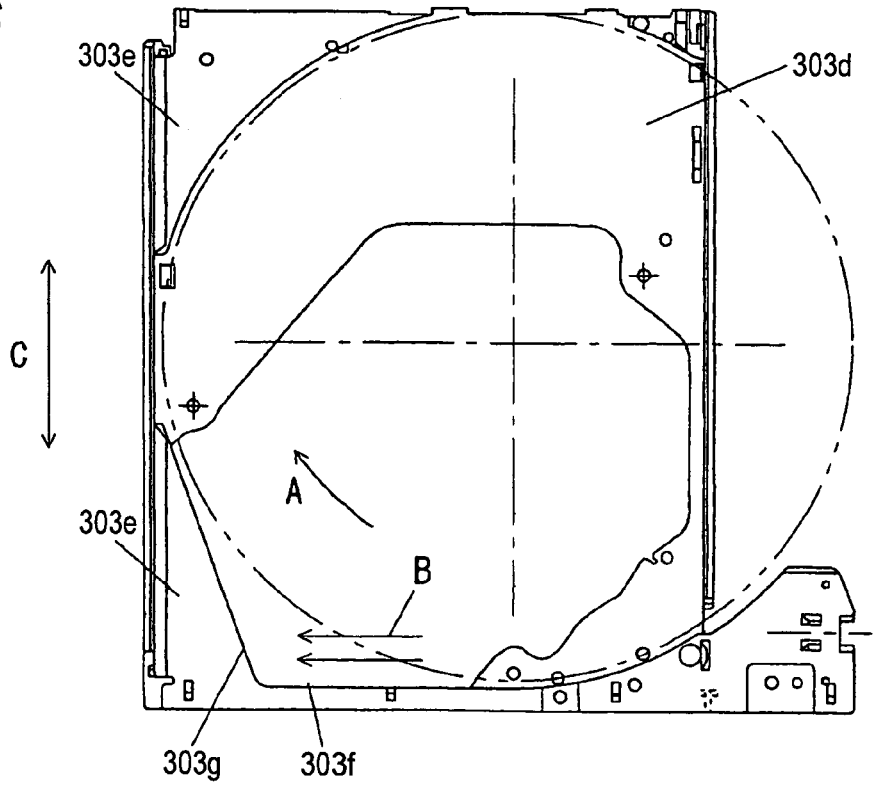
FIG. 26 is a plan view showing the optical disk device according to the embodiment of the invention.

The external wall 303g may be formed in almost parallel with a straight line passing through the center of the rotation of the optical disk (the center of the rotation of the spindle motor 305) as shown in FIG. 24, the external wall 303g may take a concave shape as shown in FIG. 25, or the external wall 303g may be inclined in such a manner that the width of the optical disk attachment region outside portion 303e is gradually reduced toward the side portion of the tray 303 as shown in FIG. 26.

Figure 27:
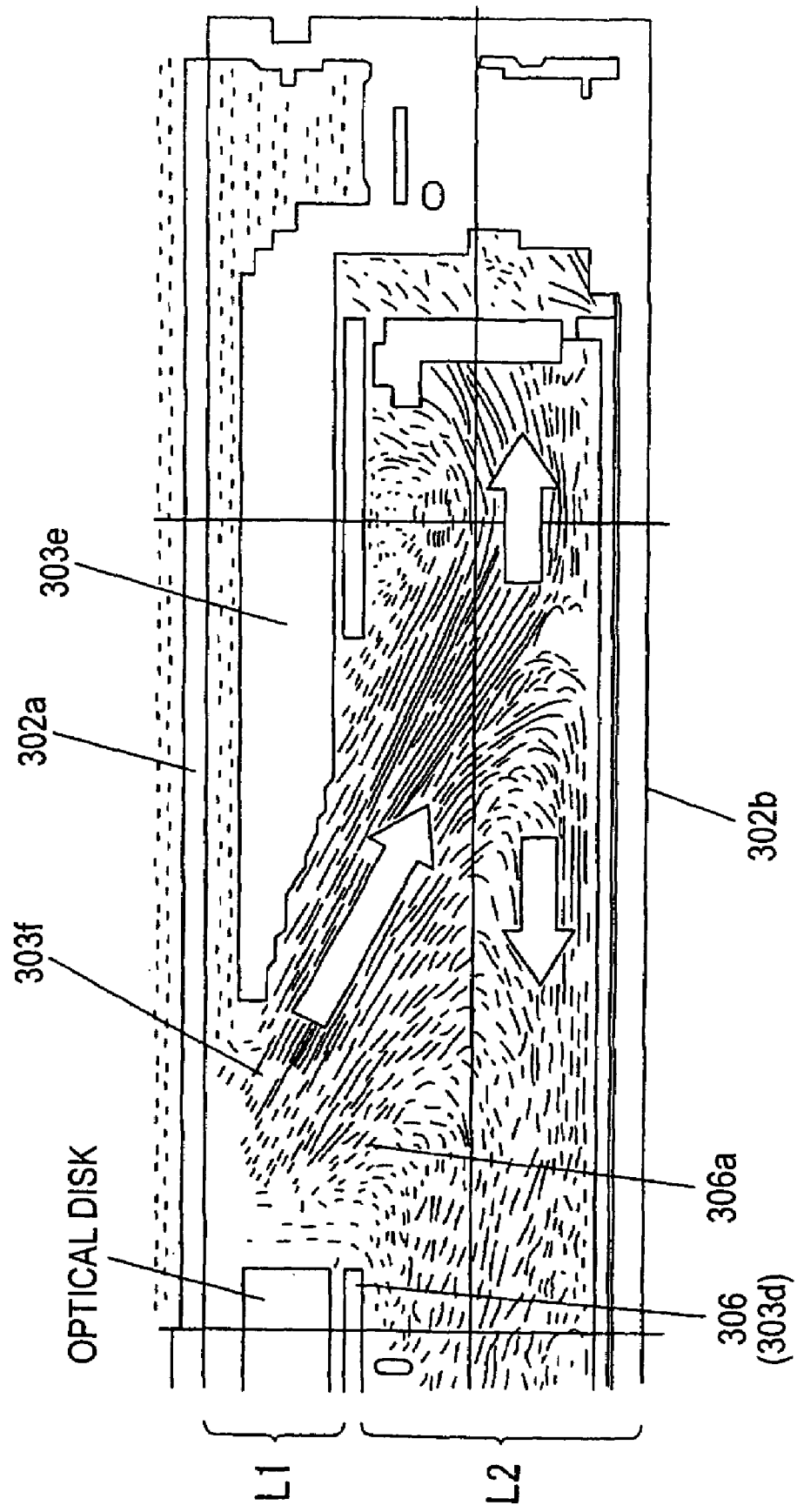
FIG. 27 is a partial sectional view showing the optical disk device according to the embodiment of the invention.

Furthermore, FIG. 27 is a view showing an air flow. It is apparent that the air flow efficiently passes through the opening 303f and the opening 306a and enters an L2 region in which most of the carriage 307 mounting a light source and a driving IC thereof is present when the optical disk is rotated in a region L1 between the cover 306 and the housing portion 302a, and the air flow (an arrow in FIG. 27) stirs the air in the L2 region effectively and sufficiently. As shown in FIG. 27, it is apparent that the air flow collides with the other members of the optical pick-up module 304 in the L2 region so that an air flow toward the spindle motor 305 is generated. Accordingly, the air flow can be generated in the direction of the movement of the carriage 307. Consequently, the air flow can be always caused to hit on the carriage so that a cooling efficiency can be enhanced.

While the air has been used as a gas flow in the embodiment, other gases may be used.

The optical disk device according to the invention can efficiently circulate the air flow. In particular, therefore, a countermeasure can be taken against an optical disk device which is thin and small-sized. Thus, it is possible to obtain such an advantage as to eliminate a drawback such as a deterioration in a recording and reproducing characteristic which is caused by heat. Thus, the invention can be adapted to electronic equipment such as a personal computer or a notebook computer.

Fifth Embodiment

An embodiment of an optical disk device according to fifth embodeiment of the invention will be described below.

Figure 28:
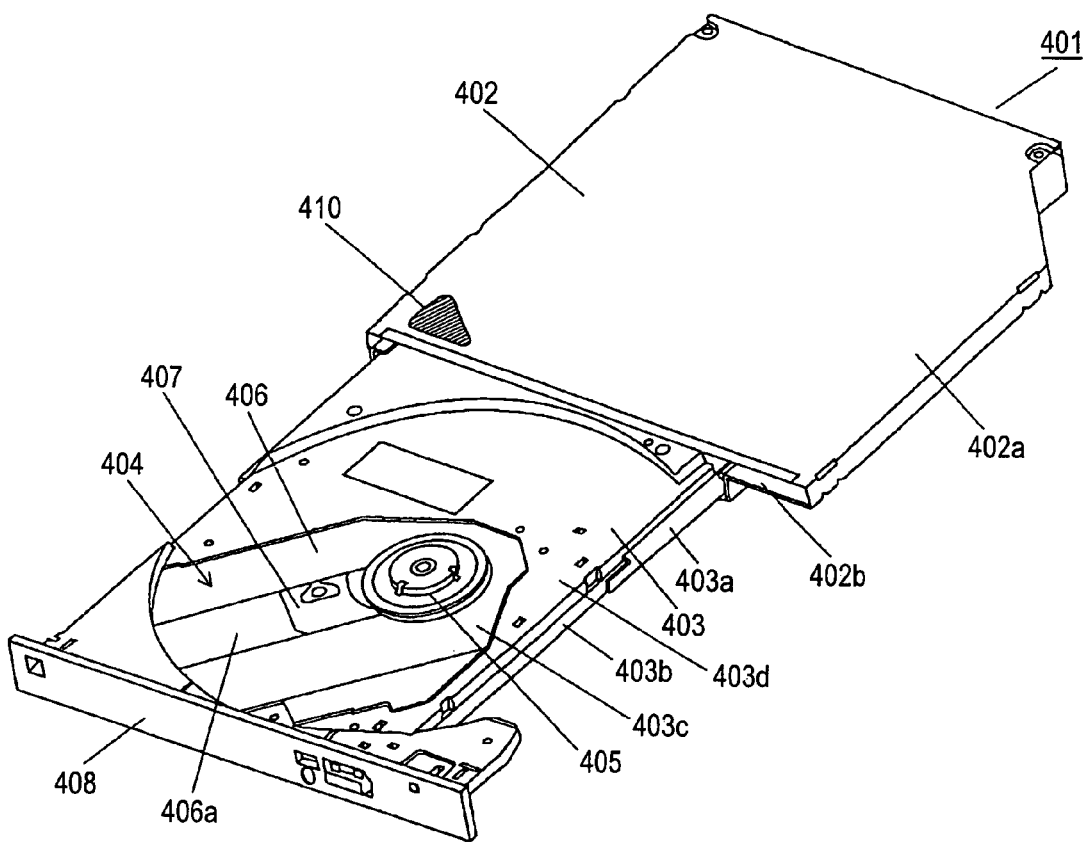
FIG. 28 is a perspective view showing a state in which a tray is pulled out in an optical disk device according to an embodiment of the invention.
Figure 29:
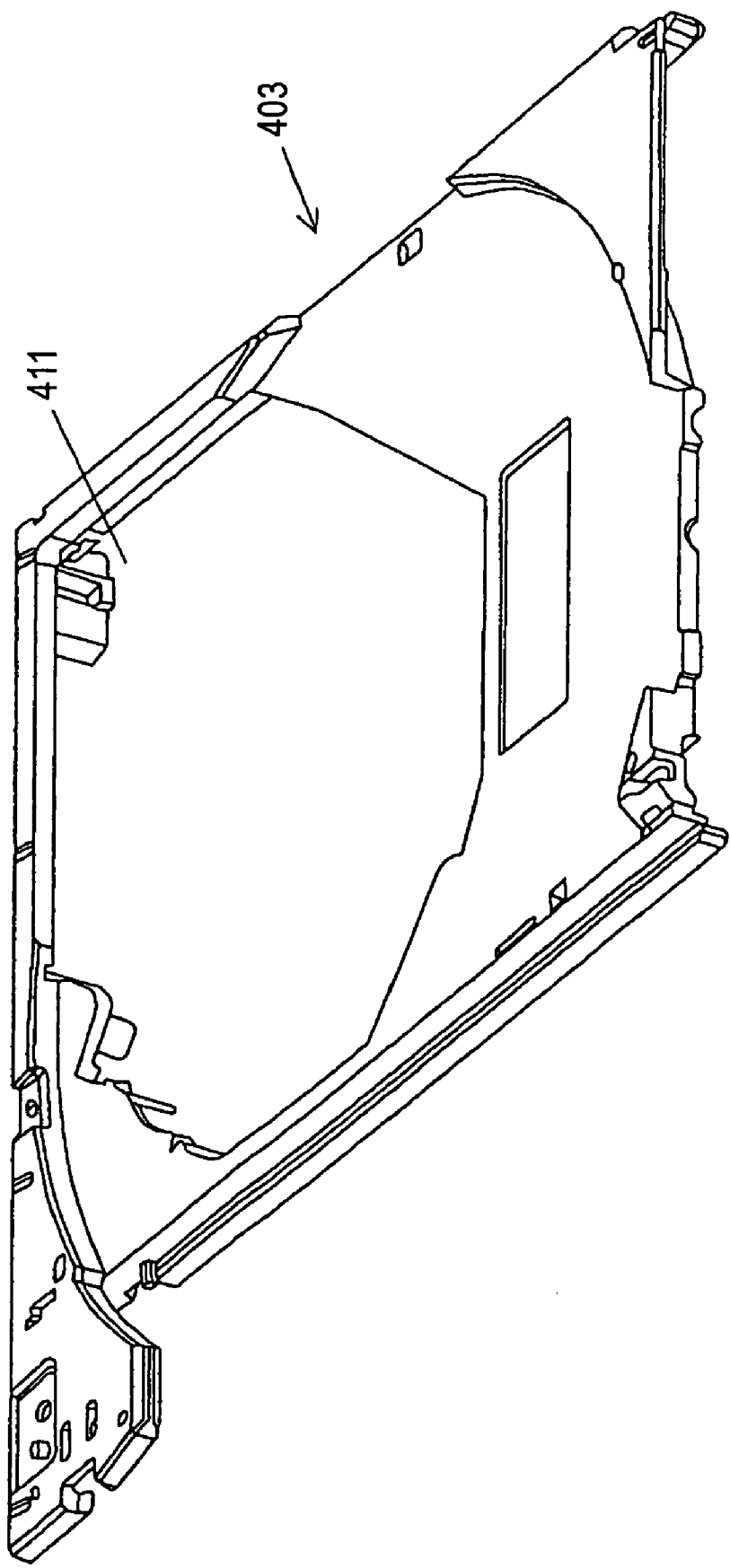
FIG. 29 is a perspective view showing only the tray.
Figure 30:
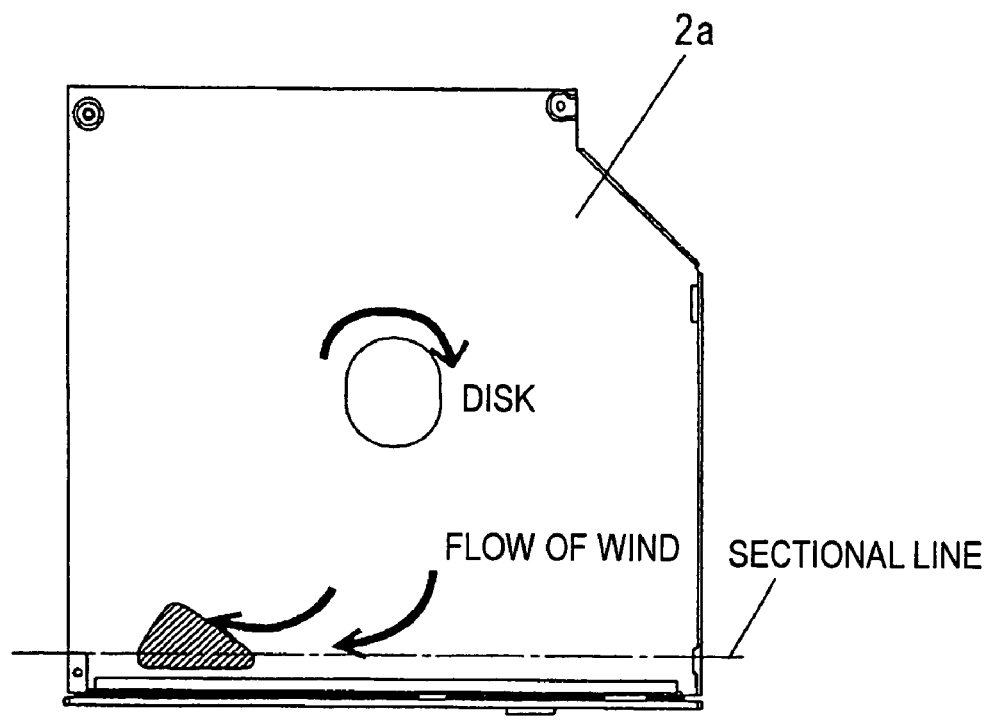
FIGS. 30(a) and 30(b) are views an air flow in the optical disk device according to the embodiment of the invention.
Figure 30:
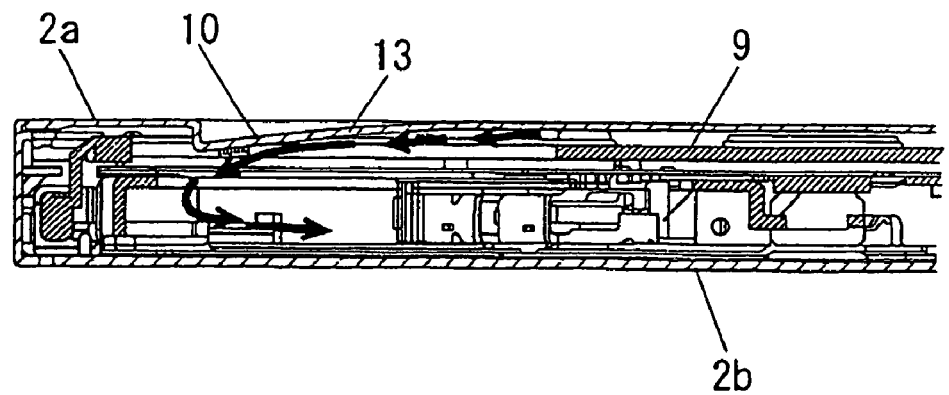

FIG. 28 is a perspective view showing a state in which a tray is pulled out in an optical disk device according to an embodiment of the invention, FIG. 29 is a perspective view showing only the tray, and FIG. 30 is a view showing an air flow in the optical disk device according to the embodiment of the invention.

In the embodiment, a tray 403 is constituted by a frame formed of a resin. An optical disk attachment region portion 403d is provided in the part of the tray 403 which is opposed to a disk in the attachment of the disk, and an outer periphery takes a circular shape corresponding to the shape of the optical disk. An optical disk attachment region outside portion 403e is provided on the outside of the optical disk attachment region portion 403d, and the optical disk attachment region portion 403d is provided with a concave portion which is concaved from the optical disk attachment region outside portion 403e by approximately 1.5 mm to 4 mm (which is equal to or slightly greater than the thickness of the optical disk to be attached).

In the embodiment, it is assumed that the tray 403 takes an almost square shape and an optical disk having a maximum diameter to be attached is disk-shaped. Therefore, the optical disk attachment region portion 403d takes an almost circular shape as described above, and furthermore, the diameter of the optical disk attachment region portion 403d is equal to the diameter of the optical disk having the maximum diameter which might be attached or is greater than the same diameter by 1 mm to 7 mm. The optical disk attachment region outside portion 403e takes an almost triangular shape. Moreover, the optical disk attachment region portion 403d indicates a region including an opposed portion to the optical disk and having a slight clearance in an outer peripheral portion in the attachment of the optical disk, and the optical disk attachment region outside portion 403e indicates a region which is not opposed to the main surface of the optical disk at all.

An opening 403c is provided on the optical disk attachment region portion 403d, and an optical pick-up module 404 is inserted from a back face and is thus attached to the opening 403c.

A spindle motor 405 is provided on almost the center of the optical disk attachment region portion 403d. At least a part of the spindle motor 405 is protruded from the opening 403c, and furthermore, a carriage 407 and a cover 406 are also exposed.

Moreover, a rail 403a is provided movably in both side portions of the tray 403 in the same manner as that shown in FIG. 9, and is held in a rail holding portion 403b provided integrally with the tray 403.

The optical pick-up module 404 has at least a spindle motor 405 for rotating and driving an optical disk, a cover 406 which is formed of a metal or a resin and is provided with an opening 406a from the spindle motor 405 to an outer periphery, and a carriage 407 having a part exposed from the opening 406a. The carriage 407 mounts a light source such as a high power laser diode, various optical members, an objective lens for constituting an optical spot on the optical disk, and an IC for driving the light source. The carriage 407 is held movably in a plurality of guide shafts (not shown) provided on the optical pick-up module 404, and furthermore, is moved to approach or separate from the spindle motor 405 by means of a feed motor (not shown).

408 denotes a bezel provided on the front end face of the tray 403. The bezel 408 is constituted to have such a size as to block the opening of the housing 402.

In the embodiment according to the invention, in the tray 403, a portion in the optical disk attachment region outside portion 403e on the bezel 408 side which is opposed to the opening 6a when the optical pick-up module 404 is to be attached is set to be an opening 411 on which a surface is not formed as shown in FIGS. 28, 29 and 30.

A dent 410 curved toward a surface side to which the optical disk is to be attached is formed in the region of the main plane of the upper housing portion 402a which corresponds to the part disposed above the opening 411 when the tray 403 is to be accommodated in the housing 402.

FIG. 30 shows a passage for air which is implemented by this structure. FIG. 30(a) is a plan view seen from the housing portion 402a side and FIG. 30(b) is a sectional view taken along a sectional line shown in FIG. 30(a). An air flow generated by the optical disk 409 rotated by means of the spindle motor 405 is comparatively strong in the outer peripheral portion of the optical disk 409. In addition, the air flow is efficiently led to the region of the tray 403 which is provided on an opposite side to the optical disk attachment side (a space interposed between the tray 403 and a housing portion 402b) through an inclined surface 413 of the dent 410 provided in a part of the main plane of the upper housing portion 402a. The carriage 407 mounting the high power light source and the driving IC for the light source is present in the region provided on the opposite side. Consequently, the air is diffused by the entrance of the air flow. Thus, the light source can be cooled effectively.

With this structure, in the case in which the optical disk is attached and the tray 403 is accommodated in the housing 402, air in a portion having a comparatively low temperature between the housing portion 402a and the optical disk can also be led effectively into the part between the housing portion 402b and the tray 403 by the rotation of the optical disk. Consequently, a cooling effect can be enhanced.

In contract with the conventional structure, it was found that the temperatures of the portion including the light source and various optical members which are mounted on the carriage 407 can be reduced by 4° C. or more in the embodiment. More specifically, in a structure in which an air passage is simply constituted as in the conventional art, it is hard to carry out effective cooling in the optical disk device 401 including the central part of the housing 402 having a thickness of 14 mm or less or 10 mm or less. By the structure according to the embodiment, however, the air flow generated on the optical disk 409 can be led very effectively to the space between the housing portion 402b for accommodating most of the carriage 407 and the tray 403. Thus, it is possible to obtain a very high cooling performance.

FIG. 31 is a view showing the housing of an optical disk device according to another embodiment of the invention. Also in the embodiment, in a tray 403, a portion in an optical disk attachment region outside portion 403e on a bezel 408 side which is opposed to an opening 406a when an optical pick-up module 404 is to be attached is set to be an opening 411 on which a surface is not formed as shown in FIG. 29.

A surface inclined to approach a surface side to which an optical disk 409 is to be attached is formed by cutting out a part of the main plane of a housing portion 402a in the region of the main plane of an upper housing portion 402a which corresponds to a part disposed above the opening 411 when the optical pick-up module 404 is to be attached to the tray 403 and the tray 403 is to be accommodated in the housing 402. The inclined surface may be formed by fixing a separate and independent plate from the main plane of the upper housing portion 402a to the main plane of the housing portion 402a through welding or adhesion. While the inclined surface is provided in three places in FIG. 31, this is not restricted thereto but the number of the inclined surfaces can be determined properly.

While the air has been used as a gas flow in the embodiment, other gases may be used.

The optical disk device according to the invention can efficiently circulate the air flow. In particular, therefore, a countermeasure can be taken against heat in an optical disk device which is thin and small-sized. Thus, it is possible to eliminate a drawback such as a deterioration in a recording and reproducing characteristic which is caused by the heat. Thus, the invention can be applied to electronic equipment such as a personal computer or a notebook computer for utilization.

This application is based upon and claims the benefit of priority of Japanese Patent Application No2003-321383 filed on Sep. 12, 2003, Japanese Patent Application No2003-335275 filed on Sep. 26, 2003, Japanese Patent Application No2003-422520 filed on Dec. 19, 2003, Japanese Patent Application No2003-422521 filed on Dec. 19, 2003, and Japanese Patent Application No2003-422522 filed on Dec. 19, 2003 the contents of which are incorporated herein by references in its entirety

What is claimed is:

1. An optical disk device comprising:
   an optical pick-up module including:
      a rotating portion that rotates an optical disk when the optical disk is mounted thereon;
      a carriage mounting at least a light source and being provided movably within the optical pick-up module; and
      a cover having an opening formed thereon, a light being radiated from said light source through the opening toward the outside of the cover; and a tray supporting the optical pick-up module, wherein:

the tray includes an optical disk attachment region portion opposed to the optical disk and an outside portion provided on an outside of the optical disk attachment region portion, the outside portion has a ledge along its portion adjacent to at least a portion of a circular perimeter of the optical disk when the optical disk is mounted on the rotating portion, the ledge having first and second opposing surfaces, the optical disk, when mounted on the rotating portion, lies entirely between a first plane defined by the surface of the cover and a second plane defined by said first opposing surface, said first opposing surface being closer to the surface of the cover than is said second opposing surface, and a concave portion is provided on a back face side of the outside portion.

2. The optical disk device according to claim 1, wherein the concave portion is constituted to include a first side wall formed on the tray almost orthogonally to a tray pull-out direction, a second side wall formed on the tray opposite to the opening and non-parallel with the first side wall, and a bottom wall formed on the tray.

3. The optical disk device according to claim 2, wherein the second side wall includes an inclined surface which is inclined with respect to the bottom wall.

4. The optical disk device according to claim 1, wherein the ledge is provided on said outside portion opposed to the concave portion as seen in the direction of the rotating axis of the disk.

5. The optical disk device according to claim 4, wherein the ledge is constituted by a separate member from the tray and the separate member is attached to the tray to form the ledge.

6. An optical disk device comprising;

an optical pick-up module including:

a rotating portion that rotates an optical disk when the optical disk is mounted thereon;

a carriage mounting at least a light source and being provided movably within the optical pick-up module; and a cover having an opening formed thereon, a light being radiated from said light source through the opening toward the outside of the cover; and a tray supporting the optical pick-up module, wherein:

the tray includes an optical disk attachment region portion opposed to the optical disk and an outside portion provided on an outside of the optical disk attachment region portion, the outside portion has a ledge along its portion adjacent to at least a portion of a circular perimeter of the optical disk when the optical disk is mounted on the rotating portion, the ledge having first and second opposing surfaces, the optical disk, when mounted on the rotating portion, lies entirely between a first plane defined by the surface of the cover and a second plane defined by said first opposing surface, said first opposing surface being closer to the surface of the cover than is said second opposing surface, and a part of the opening is provided opposite to a back face side of said outside portion.

7. The optical disk device according to claim 6, further comprising a housing for holding the tray, a central part of the housing having a thickness of 14 mm or less.

8. An optical disk device comprising:

a rotating portion that rotates an optical disk having a data plane;

an attachment region that is opposed to the whole of the data plane of the optical disk and has an opening thereon;

a carriage that mounts a light source radiating light to the data plane of the optical disk and is movably provided within the opening;

a ledge adjacent to at least a portion of a circular perimeter of the optical disk when the optical disk is mounted on the rotating portion, the ledge having first and second opposing surfaces; and an outside region that is provided outside the attachment region, wherein:

the optical disk, when mounted on the rotating portion, lies entirely between a first plane defined by the surface of the cover and a second plane defined by said first opposing surface, said first opposing surface being closer to the surface of the attachment region than is said second opposing surface, the ledge is provided along a boundary between the attachment region and the outside region, and an inclined surface is provided on a back of the outside region and inclines along a rotating direction of the rotating portion.

9. The optical disk device according to claim 8, wherein the inclined surface inclines in a manner that air flow caused by rotation of the optical disk collides with the inclined surface.

10. The optical disk device according to claim 8, wherein a concave portion is provided on a back of said outside region.

11. The optical disk device according to claim 10, wherein an inclined surface is provided on the concave portion and inclines along a rotating direction of the rotating portion.

12. The optical disk device according to claim 11, wherein the inclined surface inclines in a manner that air flow caused by rotation of the optical disk collides with the inclined surface.

* * * * *